United States Patent
Shagraev

(10) Patent No.: US 10,846,340 B2
(45) Date of Patent: Nov. 24, 2020

(54) METHOD AND SERVER FOR PREDICTING A QUERY-COMPLETION SUGGESTION FOR A PARTIAL USER-ENTERED QUERY

(71) Applicant: YANDEX EUROPE AG, Lucerne (CH)

(72) Inventor: Aleksey Galimovich Shagraev, Lyubertsy (RU)

(73) Assignee: YANDEX EUROPE AG, Lucerne (CH)

( * ) Notice: Subject to any disclaimer, the term of this patent is extended or adjusted under 35 U.S.C. 154(b) by 265 days.

(21) Appl. No.: 16/022,811

(22) Filed: Jun. 29, 2018

(65) Prior Publication Data

US 2019/0197131 A1    Jun. 27, 2019

(30) Foreign Application Priority Data

Dec. 27, 2017  (RU) .................................. 2017146276

(51) Int. Cl.
*G06F 16/9032* (2019.01)
*G06N 20/00* (2019.01)
(Continued)

(52) U.S. Cl.
CPC ...... *G06F 16/90324* (2019.01); *G06F 16/242* (2019.01); *G06F 16/24578* (2019.01); *G06N 20/00* (2019.01)

(58) Field of Classification Search
CPC . G06F 16/90324; G06F 17/30; G06F 17/3097
(Continued)

(56) References Cited

U.S. PATENT DOCUMENTS 7,461,059 B2    12/2008   Richardson et al.
8,010,547 B2    8/2011    Peng et al.
(Continued)

FOREIGN PATENT DOCUMENTS

RU    2626663 C2    7/2017
RU    2633115 C2    10/2017

OTHER PUBLICATIONS

Non-Patent Literature: "Generating Relevant and Diverse Query Phrase Suggestions using Topical N-grams;" Nguyen Kim Anh, Hung Pham-Thuc; Dec. 4-5, 2014; Vietnam.*
(Continued)

*Primary Examiner* — Giovanna B Colan
(74) *Attorney, Agent, or Firm* — BCF LLP

(57) ABSTRACT

A method and server for training a machine learning algorithm (MLA) for determining a query-completion suggestion for a partial query is disclosed. The method comprises receiving and parsing past queries into n-grams. Each one of the n-grams being associated with respective n-gram features, the n-gram features being indicative of a pair-based co-occurrence of n-grams in the past queries. The method also comprises, for a given n-gram of a given past query: selecting at least one candidate n-gram from the n-grams based on the pair-based co-occurrence; generating respective feature vectors for the given n-gram and the at least one candidate n-gram; generating a training set for the given n-gram comprising an input portion and a label portion; and training the MLA based on the training set to determine a predicted group-based co-occurrence of at least one in-use candidate n-gram and at least one in-use n-gram.

20 Claims, 10 Drawing Sheets

(51) Int. Cl.
*G06F 16/2457* (2019.01)
*G06F 16/242* (2019.01)

(58) Field of Classification Search
USPC .................................................. 707/766, 706
See application file for complete search history.

(56) References Cited

U.S. PATENT DOCUMENTS

| | | | |
|---|---|---|---|
| 8,417,718 | B1 | 4/2013 | Finkelstein et al. |
| 8,515,954 | B2 | 8/2013 | Gibbs et al. |
| 8,515,985 | B1 | 8/2013 | Zhou |
| 8,577,913 | B1 | 11/2013 | Hansson et al. |
| 8,688,727 | B1 * | 4/2014 | Das .................. G06F 16/24575 707/766 |
| 9,031,970 | B1 | 5/2015 | Das et al. |
| 9,235,654 | B1 | 1/2016 | Gupta et al. |
| 9,336,277 | B2 * | 5/2016 | Behzadi .............. G06F 16/3344 |
| 9,594,851 | B1 * | 3/2017 | Chechik ............ G06F 16/90324 |
| 9,727,603 | B1 | 8/2017 | Heiler et al. |
| 2009/0171929 | A1 | 7/2009 | Jing et al. |
| 2010/0205198 | A1 | 8/2010 | Mishne et al. |
| 2012/0179705 | A1 | 7/2012 | Kumaran et al. |
| 2012/0191745 | A1 | 7/2012 | Velipasaoglu et al. |
| 2013/0041878 | A1 | 2/2013 | Satyanarayana et al. |
| 2013/0198217 | A1 | 8/2013 | Narula et al. |
| 2014/0207746 | A1 * | 7/2014 | Song ................... G06F 16/3322 707/706 |
| 2016/0078101 | A1 | 3/2016 | Somaiya et al. |
| 2016/0188619 | A1 | 6/2016 | Su et al. |

OTHER PUBLICATIONS

Non-Patent Literature: "Query Expansion suing Associated Queries;" Bodo Billerbeck, Falk Scholar, Hugh E. Williams, Justin Zobel; Nov. 3-8, 2003; Louisiana, USA.*

Search Report with regard to the counterpart RU Patent Application No. 2017146276 dated Oct. 29, 2019.

* cited by examiner

US 10,846,340 B2

METHOD AND SERVER FOR PREDICTING A QUERY-COMPLETION SUGGESTION FOR A PARTIAL USER-ENTERED QUERY

CROSS-REFERENCE

The present application claims priority to Russian Patent Application No. 2017146276, entitled "Method and Server for Predicting a Query-Completion Suggestion for a Partial User-Entered Query", filed Dec. 27, 2017, the entirety of which is incorporated herein by reference.

FIELD

The present technology relates to query suggestions in general and, specifically, to a method and apparatus for predicting a query-completion suggestion for a partial user-entered query.

BACKGROUND

The Internet provides access to a wide variety of resources, for example, video files, image files, audio files, or Web pages. Search engines are used to search these resources. For example, digital images that satisfy a user's informational need can be identified by a search engine in response to receiving a user query submitted by a user. User queries can be composed of one or more query terms. The search system selects and ranks search results based on their relevance to the user query and on their importance or quality relative to other search results and also provides top search results to the user.

Search systems can also provide query suggestions to users to help users satisfy their informational needs. Usually, a query suggestion is used as a supplement to a partially entered user query that can be used to refine a search or refine a search strategy. Some search systems provide query suggestions in the form of a list of query suggestions as the user is typing a desired user query. However, providing query suggestions that are desirable by the user may be difficult since the desired user query that the user is typing-in is unknown at the time when the query suggestions are to be provided to the user.

SUMMARY

Developers of the present technology have appreciated certain technical drawbacks associated with the existing search systems. Conventional systems may provide query suggestions to the user that frequently co-occurred in the past with the user-entered query term for which the query suggestions are to be provided. However, determining query suggestions solely based on co-occurrence of various query terms with the user-entered query term may not provide query suggestions that are useful to the user.

In addition, conventional systems are usually configured to provide a possible continuation of a partial user-entered query as the query suggestion. For example, if the partial user-entered query is "Moscow", conventional systems may provide a query suggestion such as "City" that would continue or follow the partial user-entered query. However, provision of such continuations may not satisfy a large number of users since they might find useful query suggestions that might precede the partial user-entered query such as "Welcome to", for example.

The developers of the present technology have devised methods and systems for provision of query suggestions that take into account, not only the co-occurrence of various query terms with the user-entered query term, but also the co-occurrence of certain groups of terms that include the user-entered query term. This may allow users to benefit from a more versatile query suggestion system for providing a variety of query suggestions that may follow a partial user-entered query and/or precede the partial user-entered query while forming a useful group of terms (with the partially user-entered query) to be searched.

It is an object of the present technology to ameliorate at least some of the inconveniences present in the prior art.

In accordance with a first broad aspect of the present technology, there is provided a method of training a machine learning algorithm (MLA) for determining a query-completion suggestion for a partial user-entered query. The partial user-entered query is part of a potential user query. The method is executable by a server. The method comprises receiving, by the server, a plurality of past user queries. The method also comprises parsing, by the server, the plurality of past user queries into a plurality of n-grams. Each one of the plurality of n-grams is associated with at least one respective past user query and respective n-gram features. The n-gram features are indicative of a pair-based co-occurrence of n-grams from each possible pair of n-grams of the plurality of n-grams in the plurality of past user queries. The method also comprises, for a given n-gram of a given past user query, selecting, by the server, at least one candidate n-gram from the plurality of n-grams based on the pair-based co-occurrence of each one of the plurality of n-grams and the given n-gram in the plurality of past user queries. The method also comprises, for a given n-gram of a given past user query, generating, by the server, respective feature vectors for the given n-gram and the at least one candidate n-gram based on the respective n-gram features. The method also comprises, for a given n-gram of a given past user query, generating, by the server, a training set for the given n-gram that comprises an input portion and a label portion. The input portion is based on the given n-gram, the at least one candidate n-gram and the respective feature vectors. The label portion is based on the given past user query and the at least one candidate n-gram. The label portion is indicative of a group-based co-occurrence of a group of n-grams in the given past user query. The group of n-grams comprises (i) at least one of the at least one candidate n-gram and (ii) the given n-gram. The method also comprises, for a given n-gram of a given past user query, training, by the server, the MLA based on the training set to determine, during its in-use phase, a predicted group-based co-occurrence of at least one in-use candidate n-gram and at least one in-use n-gram in the potential user query. The at least one in-use n-gram is the partial user-entered query. The predicted group-based co-occurrence is for determining which of the at least one in-use candidate n-gram is to be used as the respective query-completion suggestion.

In some implementations of the present technology, the method may comprise determining, by the server, the n-gram features to be associated with each one of the plurality of n-grams based on the plurality of n-grams and the plurality of past user queries.

In some implementations of the present technology, the selecting the at least one candidate n-gram from the plurality of n-grams may comprise selecting, by the server, only n-grams from the plurality of n-grams that co-occurred with the given n-gram in the plurality of past user queries.

In some implementations of the present technology, the selecting the at least one candidate n-gram from the plurality of n-grams may comprise: ranking, by the server, at least some of the plurality of n-grams based on the pair-based co-occurrence of each one of the plurality of n-grams and the given n-gram in the plurality of past user queries; and selecting, by the server, at least one top ranked n-gram from the at least some of the plurality of n-grams as the at least one candidate n-gram.

In some implementations of the present technology, one of the plurality of n-grams may co-occur with the given n-gram in one of the plurality of past user queries when the one of the plurality of n-grams is either one of: a preceding n-gram to the given n-gram in the one of the plurality of past user queries, and a following n-gram to the given n-gram in the one of the plurality of past user queries.

In some implementations of the present technology, the preceding n-gram may be an immediately preceding n-gram and the following n-gram may be an immediately following n-gram.

In some implementations of the present technology, the n-gram features of the given n-gram may be indicative of the pair-based co-occurrence of each one of the plurality of n-grams and the given n-gram in the plurality of past user queries.

In some implementations of the present technology, the method may further comprise: receiving, by the server, the partial user-entered query; parsing, by the server, the partial user-entered query into the at least one in-use n-gram where the at least one in-use n-gram is associated with respective n-gram features; selecting, by the server, the at least one in-use candidate n-gram from the plurality of n-grams based on the pair-based co-occurrence of each one of the plurality of n-grams with the at least one in-use n-gram in the plurality of past user queries; generating, by the server, respective feature vectors for the at least one in-use n-gram and the at least one in-use candidate n-gram based on the respective n-gram features; and determining, by the server executing the MLA, the predicted group-based co-occurrence of the at least one in-use candidate n-gram and the at least one in-use n-gram where the determining the predicted group-based co-occurrence may be based on the at least one in-use n-gram, the at least one in-use candidate n-gram and the respective feature vectors.

In some implementations of the present technology, the at least one in-use candidate n-gram may be at least two in-use candidate n-grams. The method may further comprise ranking, by the server, the at least two in-use candidate n-grams based on the predicted group-based co-occurrence.

In some implementations of the present technology, the method may further comprise determining, by the server, which of the at least one in-use candidate n-gram is to be used as the respective query-completion suggestion based on the predicted group-based co-occurrence.

In some implementations of the present technology, the given n-gram may be at least one of: a letter-based n-gram; a phoneme-based n-gram; a syllable-based n-gram; and a word-based n-gram.

In accordance with a second broad aspect of the present technology, there is provided a server for training a machine learning algorithm (MLA) for determining a query-completion suggestion for a partial user-entered query. The partial user-entered query is part of a potential user query. The server is configured to receive a plurality of past user queries. The server is configured to parse the plurality of past user queries into a plurality of n-grams. Each one of the plurality of n-grams is associated with at least one respective past user query and respective n-gram features. The n-gram features are indicative of a pair-based co-occurrence of n-grams from each possible pair of n-grams of the plurality of n-grams in the plurality of past user queries. The server is configured to, for a given n-gram of a given past user query, select at least one candidate n-gram from the plurality of n-grams based on the pair-based co-occurrence of each one of the plurality of n-grams and the given n-gram in the plurality of past user queries. The server is configured to, for a given n-gram of a given past user query, generate respective feature vectors for the given n-gram and the at least one candidate n-gram based on the respective n-gram features. The server is configured to, for a given n-gram of a given past user query, generate a training set for the given n-gram that comprises an input portion and a label portion. The input portion is based on the given n-gram, the at least one candidate n-gram and the respective feature vectors. The label portion is based on the given past user query and the at least one candidate n-gram. The label portion is indicative of a group-based co-occurrence of a group of n-grams in the given past user query, the group of n-grams comprising (i) at least one of the at least one candidate n-gram and (ii) the given n-gram. The server is configured to, for a given n-gram of a given past user query, train the MLA based on the training set to determine, during its in-use phase, a predicted group-based co-occurrence of at least one in-use candidate n-gram and at least one in-use n-gram in the potential user query. The at least one in-use n-gram is the partial user-entered query. The predicted group-based co-occurrence is for determining which of the at least one in-use candidate n-gram is to be used as the respective query-completion suggestion.

In some implementations of the server, the server may be further configured to determine the n-gram features to be associated with each one of the plurality of n-grams based on the plurality of n-grams and the plurality of past user queries.

In some implementations of the server, the server configured to select the at least one candidate n-gram from the plurality of n-grams may comprise the server being configured to select only n-grams from the plurality of n-grams that co-occurred with the given n-gram in the plurality of past user queries.

In some implementations of the server, the server configured to select the at least one candidate n-gram from the plurality of n-grams may comprise the server being configured to: rank at least some of the plurality of n-grams based on the pair-based co-occurrence of each one of the plurality of n-grams and the given n-gram in the plurality of past user queries; and select at least one top ranked n-gram from the at least some of the plurality of n-grams as the at least one candidate n-gram.

In some implementations of the server, one of the plurality of n-grams may co-occur with the given n-gram in one of the plurality of past user queries when the one of the plurality of n-grams is either one of: a preceding n-gram to the given n-gram in the one of the plurality of past user queries, and a following n-gram to the given n-gram in the one of the plurality of past user queries.

In some implementations of the server, the preceding n-gram may be an immediately preceding n-gram and the following n-gram may be an immediately following n-gram.

In some implementations of the server, the n-gram features of the given n-gram may be indicative of the pair-based co-occurrence of each one of the plurality of n-grams and the given n-gram in the plurality of past user queries.

In some implementations of the server, the server may be further configured to: receive the partial user-entered query; parse the partial user-entered query into the at least one in-use n-gram where the at least one in-use n-gram may be associated with respective n-gram features; select the at least one in-use candidate n-gram from the plurality of n-grams based on the pair-based co-occurrence of each one of the plurality of n-grams with the at least one in-use n-gram in the plurality of past user queries; generate respective feature vectors for the at least one in-use n-gram and the at least one in-use candidate n-gram based on the respective n-gram features; and determine, by executing the MLA, the predicted group-based co-occurrence of the at least one in-use candidate n-gram and the at least one in-use n-gram. The server may be configured to determine the predicted group-based co-occurrence based on the at least one in-use n-gram, the at least one in-use candidate n-gram and the respective feature vectors.

In some implementations of the server, the at least one in-use candidate n-gram may be at least two in-use candidate n-grams and the server may be further configured to rank the at least two in-use candidate n-grams based on the predicted group-based co-occurrence.

In the context of the present specification, a "server" is a computer program that is running on appropriate hardware and is capable of receiving requests (e.g., from devices) over a network, and carrying out those requests, or causing those requests to be carried out. The hardware may be one physical computer or one physical computer system, but neither is required to be the case with respect to the present technology. In the present context, the use of the expression a "server" is not intended to mean that every task (e.g., received instructions or requests) or any particular task will have been received, carried out, or caused to be carried out, by the same server (i.e., the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "device" is any computer hardware that is capable of running software appropriate to the relevant task at hand. Thus, some (non-limiting) examples of devices include personal computers (desktops, laptops, netbooks, etc.), smartphones, and tablets, as well as network equipment such as routers, switches, and gateways. It should be noted that a device acting as a device in the present context is not precluded from acting as a server to other devices. The use of the expression "a device" does not preclude multiple devices being used in receiving/ sending, carrying out or causing to be carried out any task or request, or the consequences of any task or request, or steps of any method described herein.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, lists of words, etc.

In the context of the present specification, the expression "component" is meant to include software (appropriate to a particular hardware context) that is both necessary and sufficient to achieve the specific function(s) being referenced.

In the context of the present specification, the expression "computer usable information storage medium" is intended to include media of any nature and kind whatsoever, including RAM, ROM, disks (CD-ROMs, DVDs, floppy disks, hard drivers, etc.), USB keys, solid state-drives, tape drives, etc.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
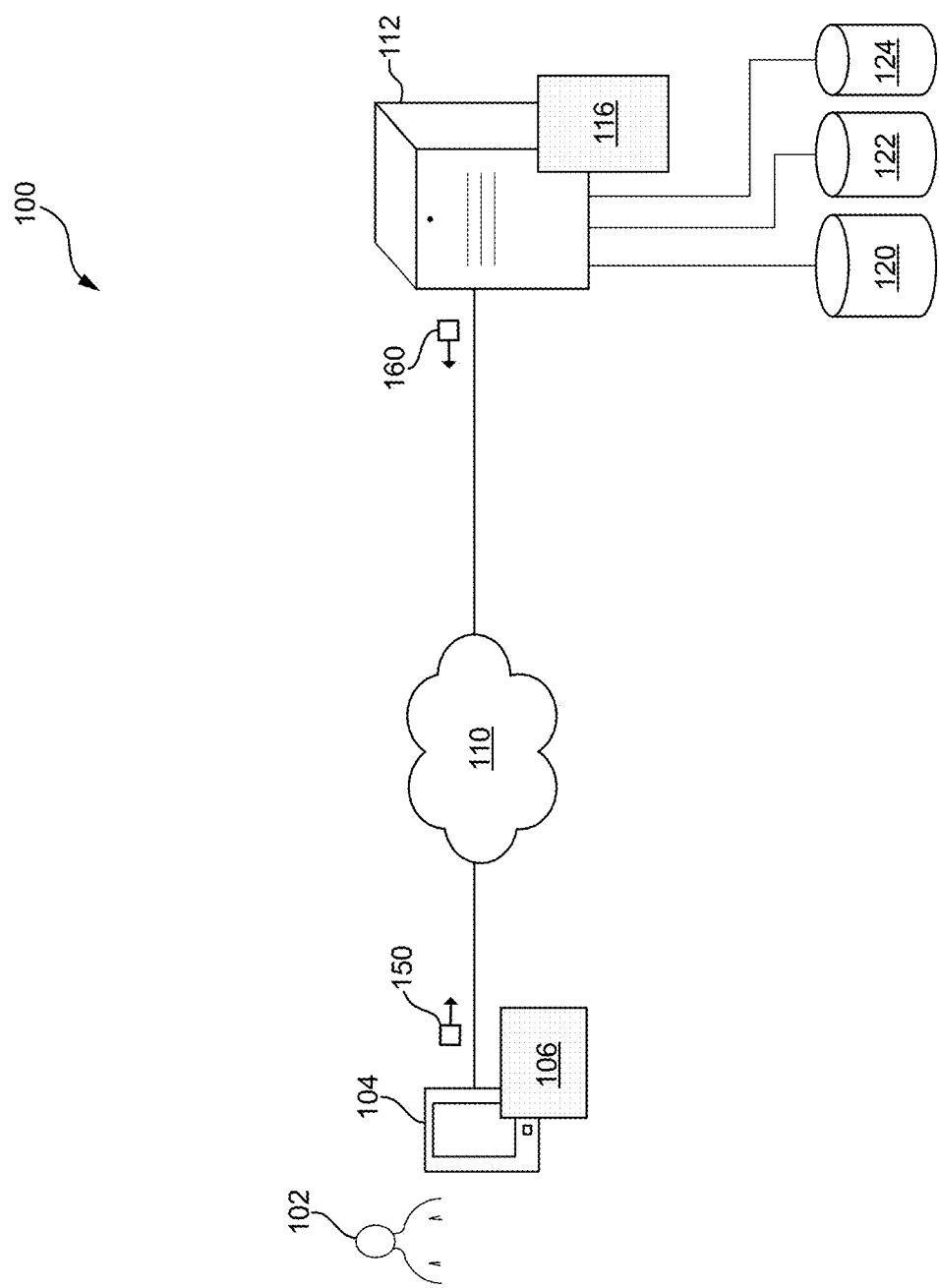
FIG. 1 depicts a system suitable for implementing non-limiting embodiments of the present technology.

Referring to FIG. 1, there is shown a schematic diagram of a system 100, the system 100 being suitable for implementing non-limiting embodiments of the present technology. It is to be expressly understood that the system 100 as depicted is merely an illustrative implementation of the present technology. Thus, the description thereof that follows is intended to be only a description of illustrative examples of the present technology. This description is not intended to define the scope or set forth the bounds of the present technology. In some cases, what are believed to be helpful examples of modifications to the system 100 may also be set forth below. This is done merely as an aid to understanding, and, again, not to define the scope or set forth the bounds of the present technology. These modifications are not an exhaustive list, and, as a person skilled in the art would understand, other modifications are likely possible. Further, where this has not been done (i.e., where no examples of modifications have been set forth), it should not be interpreted that no modifications are possible and/or that what is described is the sole manner of implementing that element of the present technology. As a person skilled in the art would understand, this is likely not the case. In addition it is to be understood that the system 100 may provide in certain instances simple implementations of the present technology, and that where such is the case they have been presented in this manner as an aid to understanding. As persons skilled in the art would understand, various implementations of the present technology may be of a greater complexity.

Generally speaking, the system 100 is configured to provide suggested queries and/or search results to a device 104 for display thereof to a user 102. The system 100 comprises the device 104, the device 104 being associated with the user 102. As such, the device 104 can sometimes be referred to as an "electronic device", "end user device", "client electronic device" or simply "device". It should be noted that the fact that the device 104 is associated with the user 102 does not need to suggest or imply any mode of operation—such as a need to log in, a need to be registered, or the like.

The implementation of the device 104 is not particularly limited, but as an example, the device 104 may be implemented as a personal computer (desktops, laptops, netbooks, etc.), a wireless communication device (such as a smartphone, a cell phone, a tablet and the like), as well as network equipment (such as routers, switches, and gateways). The device 104 comprises hardware and/or software and/or firmware (or a combination thereof), as is known in the art, to execute a browser application 106. Generally speaking, the purpose of the browser application 106 is to enable the user 102 to access one or more web resources. How the browser application 106 is implemented is not particularly limited. One example of the browser application 106 may be embodied as a Yandex™ browser.

Figure 2:
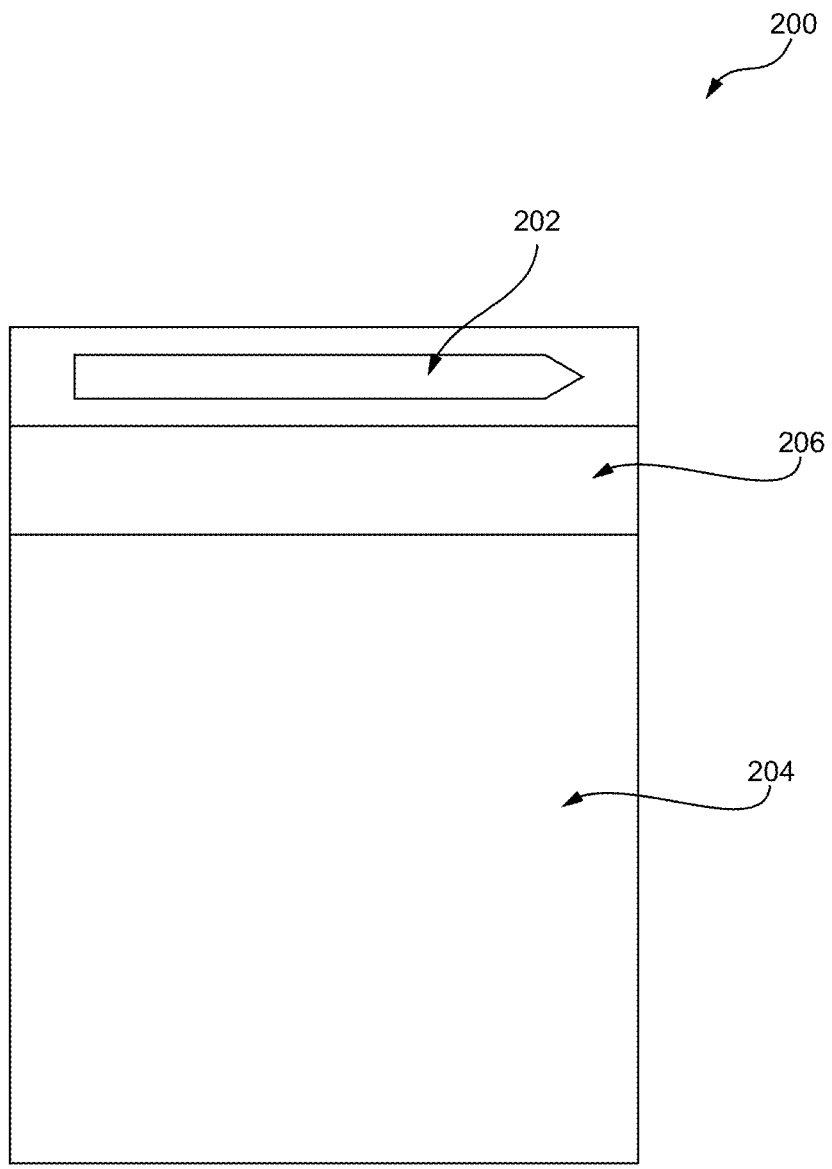
FIG. 2 depicts a browser window of a browser application of a user device of FIG. 1 at a first moment in time according to some embodiments of the present technology.
Figure 7:
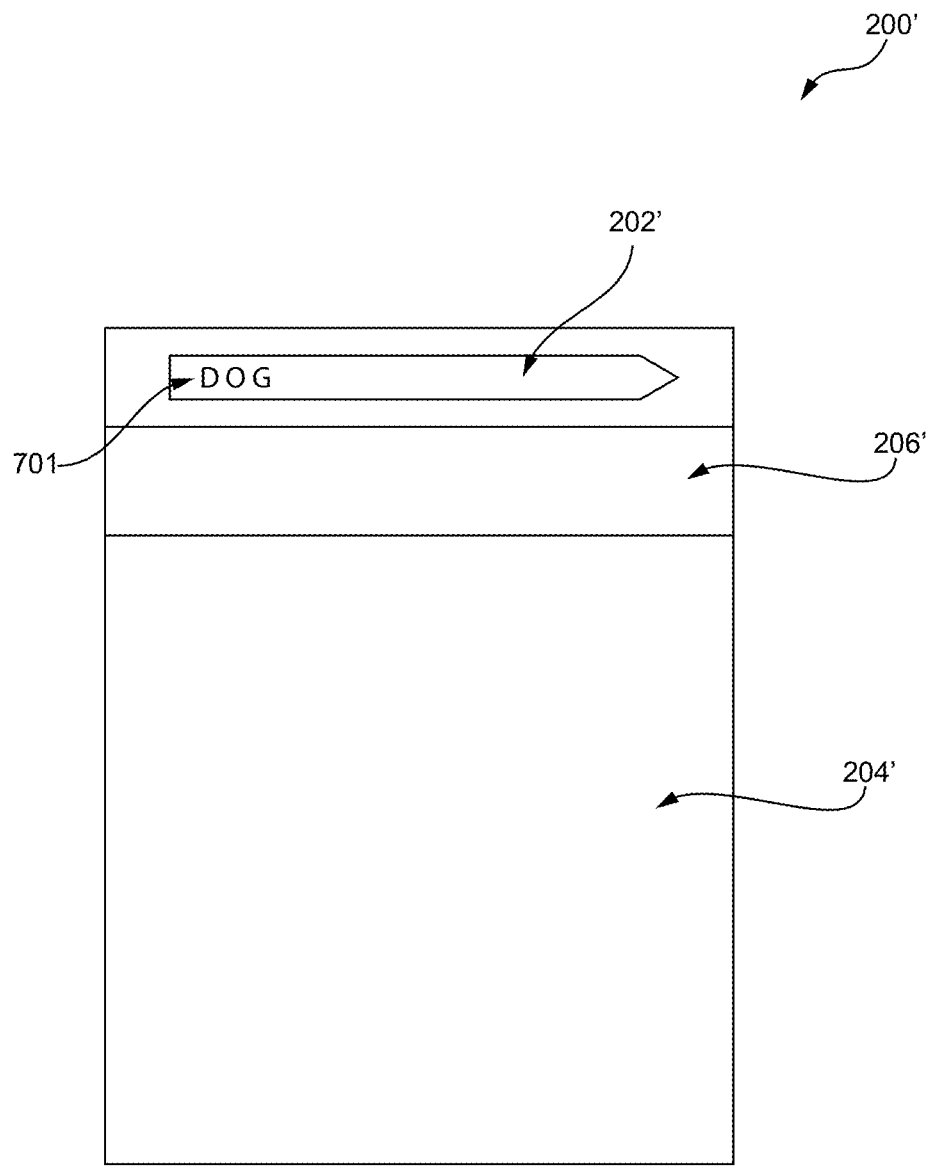
FIG. 7 depicts the browser window of FIG. 2 at a second moment in time according to some embodiments of the present technology.
Figure 9:
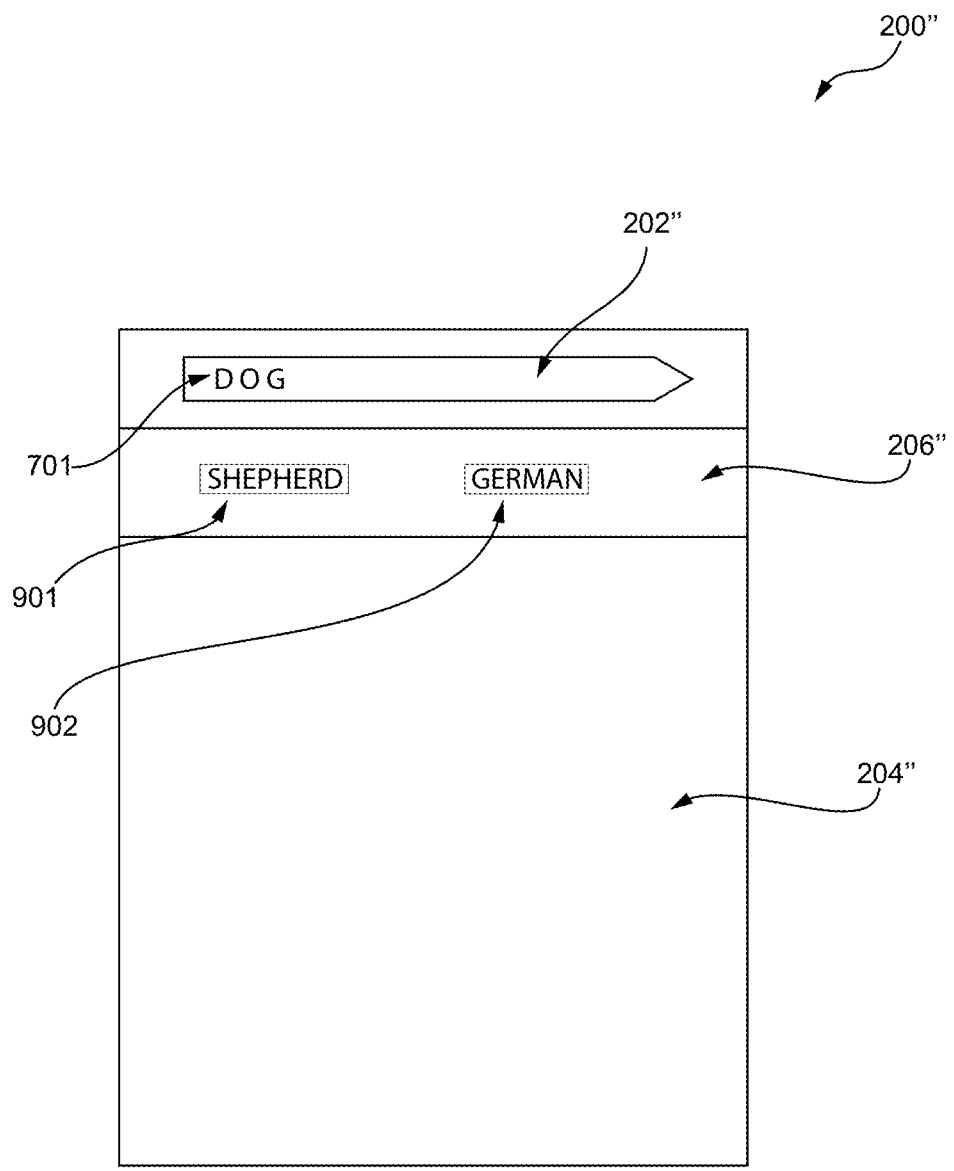
FIG. 9 depicts the browser window of FIG. 2 at a third moment in time according to some embodiments of the present technology.

With reference to FIG. 2, there is depicted a browser window 200 of the browser application 106 as displayed by the device 104 to the user 102 at a first moment in time. In FIG. 7, there is depicted a browser window 200' of the browser application 106 as displayed by the device 104 at a second moment in time. In FIG. 9, there is depicted a browser window 200" of the browser application 106 as displayed by the device 104 at a third moment in time. It should be noted that the browser windows 200, 200' and 200", although numbered separately, may be the same browser window but displayed by the device 104 to the user 102 at different moments in time.

The browser window 200 comprises an "omnibar" 202. It should be noted that the browser windows 200' and 200" also comprise omnibars 202' and 202", respectively, which are both the same as the omnibar 202 but at different moments in time. Generally speaking, the omnibar 202 is a multi-function bar configured to enable various functions of the browser application 106.

The omnibar 202 enables "address bar functions" and, as such, shows current URLs and enables the user 102 to type-in (or otherwise enter) URLs into the omnibar 202 for navigation to a user-chosen web resource. For example, the user 102 may access the one or more web resources by typing in (or otherwise copy-pasting or selecting a link or dictating) the URL associated with the one ore more web resources into the omnibar 202. As a result, the device 104 may be configured to retrieve information associated with the one or more web resources associated with the typed-in (or otherwise entered) URL and display it to the user 102 via the browser application 106 in a display portion 204 of the browser window 200. It should be noted that the browser windows 200' and 200" also comprise display portions 204' and 204", respectively, which are both the same as the display portion 204 but at different moments in time.

The omnibar 202 also enables "search bar functions" and, as such, enables the user 102 to type-in (or otherwise enter) and submit user-entered queries for searching for specific information. For example, the user 102 may submit a given user-entered query via the omnibar 202 which may be transmitted by the device 104 to a given search engine for searching for specific information associated with this user-entered query. As a result, the device 104 may then receive the specific information and may display it to the user 102 in the display portion 204 of the browser window 200. Therefore, it can be said that the omnibar 202 may be associated with a given search engine hosted on a given server (such as, for example, a server 112 depicted in FIG. 1) for submitting user-entered query thereto and thereby enabling search bar functions of the omnibar 202.

The omnibar 202 also enables "query-completion functions" and, as such, enables transmitting a giving partial user-entered query, when the user 102 has not typed-in completely (or otherwise has not entered completely) a given desired user query into the omnibar 202, for receiving in return query-completion suggestions therefor.

With reference to FIG. 7, let it be assumed that the user 102 typed-in (or otherwise entered) "dog" into the omnibar 202' of the browser window 200' of the browser application 106 at the second moment in time. It should be understood that "dog" may be a given desired user query of the user 102 or a given partial user-entered query of the user 102 if the user 102 intends to type-in more words. In this example, the user 102 may intend to type-in any one of many potential user queries such as "black dog", "shepherd dog", "brown dog is cute", "german shepherd dog" and the like, where each one of the potential user queries contains "dog". However, it should be understood that in the case where "dog" is the given partial user-entered query, the desired user query of the user 102 is apriori unknown.

In some embodiments of the present technology, the browser application 106 may be configured to determine that "dog" is the given partial user-entered query. For example, a query-completion trigger may be activated in response to a keystroke by the user 102. In this example, the query-completion trigger may be activated in response to the keystroke performed by the user 102 in order to type-in the letter "g" from "dog". It is contemplated that the query-completion trigger may be activated in response to each and every keystroke performed by the user 102. It is also contemplated that other appropriate query-completion triggers may be used to determine that "dog" is the given partial user-entered query without departing from the scope of the present technology.

As such, in response to the activation of the query-completion trigger, the omnibar 202 (the browser application 106) may enable the device 104 to transmit "dog" as a partial user-entered query 701 to the server 112. For example, the device 104 may be configured to generate a data packet 150 depicted in FIG. 1 which comprises information indicative of "dog" being the partial user-entered query 701. The data packet 150 may be transmitted to the server 112 via a communication network 110. How the communication network 110 is implemented will be further described herein below.

The device 104 may receive various query-completion suggestions for the partial user-entered query 701. For example, the device 104 may receive a data packet 160 from the server 112 via the communication network 110, where the data packet 160 comprises information indicative of various query-completion suggestions.

With reference to FIG. 9, as previously mentioned, there is depicted the browser window 200" of the browser application 106 that is displayed to the user 102 at the third moment in time. Query-completion suggestions 901 and 902 for the partial user-entered query 701 "dog" may be displayed to the user 102 in a query-completion portion 206" of the browser window 200" for enabling the user 102 to complete the partial user-entered query 701 "dog" without the need of typing-in (or otherwise entering) the rest of the given desired user query into the omnibar 202".

Generally, this may help in assisting the user 102 during submission of desired user queries to the associated search engine. For example, the user 102 may select at least one of the query-completion suggestions 901 and 902 in order to supplement the partial user-entered query 701 "dog" for submitting a more specific query to the associated search engine.

However, it should be understood that the given desired user query is apriori unknown. As such, providing desirable query-completion suggestions to the user 102 for supplementing the partial user-entered query 701 may be challenging because the given desired user query of the user 102 may be one of a very large number of potential user queries and, therefore, there is an even larger number of possible query-completion suggestions from which the server 112 needs to determine the query-completion suggestions 901 and 902. How the query-completion suggestions 901 and 902 are determined by the server 112 hosting the associated search engine will be further described herein below.

Returning to the description of FIG. 2, although the omnibar 202 is a multi-function bar, it is contemplated that the omnibar 202 may be configured to enable search bar functions and query-completion functions only (e.g., used exclusively for transmitting desired user queries and partial user-entered queries).

It should be noted that any one of a given desired user query, a given partial user-entered query, a given potential user query and a given query-completion suggestion contains "n-grams". Generally speaking, a given n-gram is a sequence of one or more characters from a text. It is contemplated that n-grams may be phonemes, syllables, letters, words or other text portions of any one of the given desired user query, the given partial user-entered query, the given potential user query and the given query-completion suggestion and will depend on inter alia various implementations of the present technology.

Let's consider an example of a given text string being "cat is red". In one implementation, the given text string contains word-based n-grams such as "cat", "is" and "red". In another implementation, the given text string contains letter-based n-grams such as "c", "a", "t", "i", "s", "r", "e" and "d". In yet another implementation, it is envisioned that the given text string contains syllable-based n-grams, and so on.

Returning to the description of FIG. 1, the device 104 is communicatively coupled to the communication network 110 for accessing the server 112 and/or other web resources (not depicted). In some non-limiting embodiments of the present technology, the communication network 110 can be implemented as the Internet. In other non-limiting embodiments of the present technology, the communication network 110 can be implemented differently, such as any wide-area communication network, local-area communication network, a private communication network and the like. How a communication link (not separately numbered) between the device 104 and the communication network 110 is implemented will depend inter alia on how the device 104 is implemented.

Merely as an example and not as a limitation, in those embodiments of the present technology where the device 104 is implemented as a wireless communication device (such as a smartphone), the communication link can be implemented as a wireless communication link (such as but not limited to, a 3G communication network link, a 4G communication network link, Wireless Fidelity, or WiFi® for short, Bluetooth® and the like). In those examples where the device 104 is implemented as a notebook computer, the communication link can be either wireless (such as Wireless Fidelity, or WiFi® for short, Bluetooth® or the like) or wired (such as an Ethernet based connection).

The system 100 also comprises the server 112 that can be implemented as a conventional computer server. In an example of an embodiment of the present technology, the server 112 can be implemented as a Dell™ PowerEdge™ Server running the Microsoft™ Windows Server™ operating system. Needless to say, the server 112 can be implemented in any other suitable hardware, software, and/or firmware, or a combination thereof. In the depicted non-limiting embodiments of the present technology, the server 112 is a single server. In alternative non-limiting embodiments of the present technology, the functionality of the server 112 may be distributed and may be implemented via multiple servers.

Generally speaking, the server 112 may be under control and/or management of a search engine provider (not depicted), such as, for example, an operator of the Yandex™ search engine. Hence, as previously mentioned, the server 112 hosts the search engine associated with the omnibar 202 (see FIG. 2) and/or with the browser application 106. As such, the server 112 may be configured to execute one or more searches responsive to desired user queries submitted via the omnibar 202.

As previously mentioned, the server 112 is configured to transmit various query-completion suggestions via the data packet 160 to the device 104 for display thereof to the user 102 via the browser application 106 in response to receiving a given partial user-entered query.

The server 112 also implements a machine learned algorithm (MLA) 116 and is communicatively coupled to a main database 120, a query database 122 and search result database 124.

In the depicted illustration, the main database 120, the query database 122 and the search result database 124 are depicted as separate physical entities. This does not need to be so in each and every embodiment of the present technology. As such, the main database 120 and the query database 122 and the search result database 124 may be implemented in a single database. Furthermore, any one of the main database 120, the query database 122 and the search result database 124 may, in itself, be split into several distributed storages. By the same token, all (or any combination of) the MLA 116, the main database 120, the query database 122 and the search result database 124 may be implemented in a single hardware apparatus.

The main database 120 is configured to store information extracted or otherwise determined or generated by the server 112 during processing. Generally speaking, the main database 120 may receive data from the server 112 which was extracted or otherwise determined or generated by the server 112 during processing for temporary and/or permanent storage thereof and may provide stored data to the server 112 for use thereof.

As it will be described in further details herein below, the server 112 may be configured to make use of historical information collected from a large number of past user queries. As such, the query database 122 is configured to store information associated with past user queries submitted to the server 112. Put another way, the query database 122 may comprise one or more collections of data relating to past user queries that the user 102 and/or other users of the search engine have previously submitted to the server 112.

The server 112 may be configured to provide search results in response to a given desired user query submitted thereto. As such, the search result database 124 is configured to store information associated with at least some of all possible search results that the server 112 may provide in response to desired user queries submitted thereto. Types of search results and how the search result database 124 is implemented are not particularly limiting, however, suffice it to state that the server 112 may retrieve a set of search results from the search result database 124 for a desired user query submitted to the server 112 by the user 102 of the device 104 (or any other user of the search engine) and may provide the set of search results to the device 104 for display thereof to the user 102 (or the any other user of the search engine).

As previously mentioned, the server 112 implements the MLA 116. The MLA 116 is used by the server 112 at least partially for determining query-completion suggestions for partial user-entered queries. For example, the server 112 may make use of the MLA 116 for determining the query-completion suggestions 901 and 902 depicted in FIG. 9 for the partial user-entered query 701. Generally speaking, a given MLA is first trained during its training phase and is then used during its in-use phase by the server 112. The training and in-use phases of the MLA 116 will now be discussed in turn.

Training Phase of the MLA 116

As previously mentioned, the server 112 may make use of historical information collected from a large number of past user queries. As such, the server 112 is configured to receive a plurality of past user queries 300 depicted in FIG. 3. For example, the server 112 may receive the plurality of past user queries 300 from the query database 122. The plurality of past user queries 300 may comprise past user queries that have been previously submitted to the search engine of the server 112.

Figure 3:
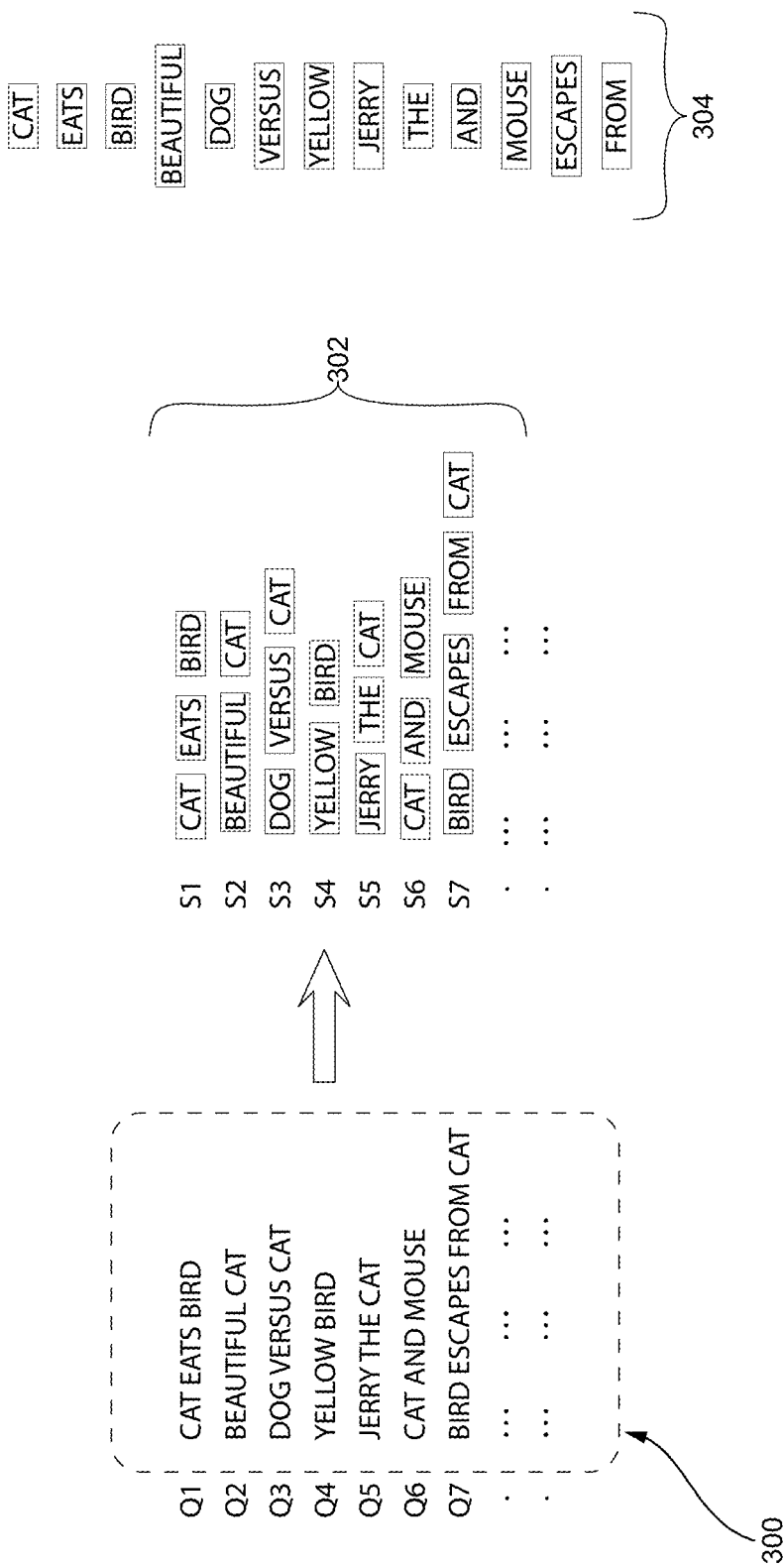
FIG. 3 depicts a plurality of past user queries and a plurality of n-grams according to some embodiments of the present technology.

In this non-limiting example depicted in FIG. 3, the plurality of past user queries 300 comprises the following past user queries:

Q1 being "cat eats bird";
Q2 being "beautiful cat";
Q3 being "dog versus cat";
Q4 being "yellow bird";
Q5 being "jerry the cat";
Q6 being "cat and mouse"; and
Q7 being "bird escapes from cat".

It should be understood that the plurality of past user queries 300 may comprise a large number of past user queries such as 1000, 10000, 100000 past user queries and the like without departing from the scope of the present technology.

In some embodiments of the present technology, the server 112 may be configured to parse each one of the plurality of past user queries 300 into a respective sequence of n-grams. For example, the server 112 may parse the plurality of past user queries 300 into a plurality of sequences of n-grams 302. Although in this illustration each one of the plurality of sequences of n-grams 302 comprises word-based n-grams, it should be understood that the server 112 may be configured to parse each one of the plurality of past user queries 300 into a respective sequence of n-grams that comprises syllable-based, phoneme-based, letter-based n-grams or a combination thereof and the like without departing from the scope of the present technology.

As such, the server 112 may be configured to parse:

Q1 into a sequence S1 of "cat", "eats" and "bird";
Q2 into a sequence S2 of "beautiful" and "cat";
Q3 into a sequence S3 of "dog", "versus" and "cat";
Q4 into a sequence S4 of "yellow" and "bird";
Q5 into a sequence S5 of "jerry", "the" and "cat";
Q6 into a sequence S6 of "cat", "and" and "mouse"; and
Q7 into a sequence S7 of "bird", "escapes", "from" and "cat".

It should be noted that in the past user query Q1, the n-gram "cat" is a preceding n-gram to the n-gram "bird" and to the n-gram "eats". More particularly, in the past user query Q1, the n-gram "cat" is an immediately preceding n-gram to the n-gram "eats". It should also be noted that the n-gram "bird" is a following n-gram to the n-gram "cat" and to the n-gram "eats". More particularly, in the past user query Q1, the n-gram "bird" is an immediately following n-gram to the n-gram "eats".

In some embodiments of the present technology, a given n-gram may be determined by the server 112 as co-occurring with another given n-gram when the given n-gram is either one of (i) a preceding n-gram to the another given n-gram in a same past user query and (ii) a following n-gram to the another given n-gram in the same past user query. For example, in these embodiments, it can be said that the n-gram "cat" co-occurred with the n-gram "eats" and with the n-gram "bird" in the past user query Q1. Continuing with the same example, in these embodiments, it can be said that the n-gram "eats" co-occurred with the n-gram "cat" and with the n-gram "bird" in the past user query Q1. Continuing with the same example, in these embodiments, it can be said that the n-gram "bird" co-occurred with the n-gram "cat" and with the n-gram "eats" in the past user query Q1.

In other embodiments of the present technology, the given n-gram may be determined by the server 112 as co-occurring with the another given n-gram when the given n-gram is either one of (i) an immediately preceding n-gram to the another given n-gram in a same past user query and (ii) an immediately following n-gram to the another given n-gram in the same past user query. For example, in these embodiments, it can be said that the n-gram "cat" co-occurred with the n-gram "eats" but not with the n-gram "bird" in the past user query Q1. Continuing with the same example, in these embodiments, it can be said that the n-gram "eats" co-occurred with the n-gram "cat" and with the n-gram "bird" in the past user query Q1. Continuing with the same example, in these embodiments, it can be said that the n-gram "bird" co-occurred with the n-gram "eats" but not with the n-gram "cat" in the past user query Q1.

The server 112 is configured to parse the plurality of past user queries 300 into a plurality of n-grams 304, which comprises all different n-grams in the plurality of past user queries 300. For example, the server 112 may parse the plurality of past user queries 300 into the plurality of n-grams 304 that comprises the n-grams: "cat", "eats", "bird", "beautiful", "dog", "versus", "yellow", "jerry", "the", "and", "mouse", "escapes" and "from". It should be understood that, since the plurality of past user queries 300 may comprise a large number of other past user queries that are different from the past user queries Q1, Q2, Q3, Q4, Q5, Q6 and Q7, the plurality of n-grams 304 may comprise other n-grams to those listed above without departing form the scope of the present technology.

Each one of the plurality of n-grams 304 is associated with at least one of the plurality of past user queries 300. For example, the n-gram "cat" of the plurality of n-grams 304 is associated with the past user queries Q1, Q2, Q3, Q5, Q6 and Q7 since the n-gram "cat" is part of each one of the past user queries Q1, Q2, Q3, Q5, Q6 and Q7. As another example, the n-gram "escapes" in the plurality of n-grams 304 is associated with the past user query Q7 since the n-gram "escapes" is part of the past user query Q7.

It is contemplated that each one of the plurality of n-grams 304 may be further associated with its respective n-gram positions in the plurality of past user queries 300. For example, the n-gram "escapes" in the plurality of n-grams 304 may be associated with the past user query Q7 and with a $2^{nd}$ n-gram position since it is the $2^{nd}$ n-gram in the sequence of n-grams S7.

The server 112 is configured to determine a pair-based co-occurrence of n-grams in the plurality of n-grams 304. In other words, the server 112 may be configured to determine a number of times that each possible pair of n-grams in the plurality of n-grams 304 have co-occurred in the plurality of past user queries 300.

For example, assuming (i) that the plurality of past user queries 300 comprises only the past user queries Q1, Q2, Q3, Q4, Q5, Q6 and Q7, and (ii) that a given n-gram co-occurs with another given n-gram when the given n-gram is either one of (i) a preceding n-gram to the another given n-gram in a same past user query and (ii) a following n-gram to the another given n-gram in the same past user query, the pair-based co-occurrence of the pair of n-grams "cat" and "bird" is two (2) since the pair of n-grams "cat" and "bird" co-occurred twice in the plurality of past user queries 300, namely in the past user queries Q1 and Q7. Assuming the same, the pair-based co-occurrence of the pair of n-grams "dog" and "bird" is zero (0) since the pair of n-grams "dog" and "bird" did not co-occur in any one of the plurality of past user queries 300.

It is contemplated that a pair-based co-occurrence of a given pair of n-grams may be a ratio of (i) the number of times that the given pair of n-grams in the plurality of n-grams 304 have co-occurred in the plurality of past user queries 300 over (ii) a number of past user queries in the plurality of past user queries 300.

For example, assuming (i) that the plurality of past user queries 300 comprises only the past user queries Q1, Q2, Q3, Q4, Q5, Q6 and Q7, and (ii) that a given n-gram co-occurs with another given n-gram when the given n-gram is either one of (i) a preceding n-gram to the another given n-gram in a same past user query and (ii) a following n-gram to the another given n-gram in the same past user query, the pair-based co-occurrence of the pair of n-grams "cat" and "bird" may be "2/7".

The server 112 is also configured to associate each one of the plurality of n-grams 304 with respective n-gram features. Generally speaking, n-gram features of a respective n-gram comprise indications of the pair-based co-occurrence of the respective n-gram with each one of the plurality of n-grams 304. In this example, this means that the n-gram features of the n-gram "cat" comprise indications of the pair-based co-occurrence of the n-gram "cat" with each one of the n-grams "cat", "eats", "bird", "beautiful", "dog", "versus", "yellow", "ferry", "the", "and", "mouse", "escapes" and "from".

Generally speaking, the server 112 is configured to generate training sets that are to be used for training the MLA 116. The server 112 may be configured to generate a respective training set for each n-gram in each one of the plurality of past user queries 300. For example, the server 112 may be configured to generate three (3) training sets for the past user query Q1, where each of these three (3) training sets is associated with a respective one of the n-grams "cat", "eats" and "bird" of the past user query Q1. In another example, the server 112 may be configured to generate four (4) training sets for the past user query Q7, where each of these four (4) training sets is associated with a respective one of the n-grams "bird", "escaped", "from" and "cat" of the past user query Q7.

How the server 112 is configured to generate a first training set 601 (see FIG. 6) for the n-gram "cat" of the past user query Q1 will be further described herein below. However, it should be understood that the server 112 may be configured to generate a second training set 606 for the n-gram "eats" of the past user query Q1 similarly to how the server 112 is configured to generate the first training set 601 for the n-gram "cat" of the past user query Q1. Also, it should be understood that the server 112 may be configured to generate a third training set 612 for the n-gram "bird" of the past user query Q1 similarly to how the server 112 is configured to generate the training set 601 for the n-gram "cat" of the past user query Q1. It should further be understood that the server 112 may be configured to generate training sets for each one of the plurality of past user queries 300 similarly to how the server 112 may generate the first, second and third training sets 601, 606 and 612 for the past user query Q1.

Figure 4:
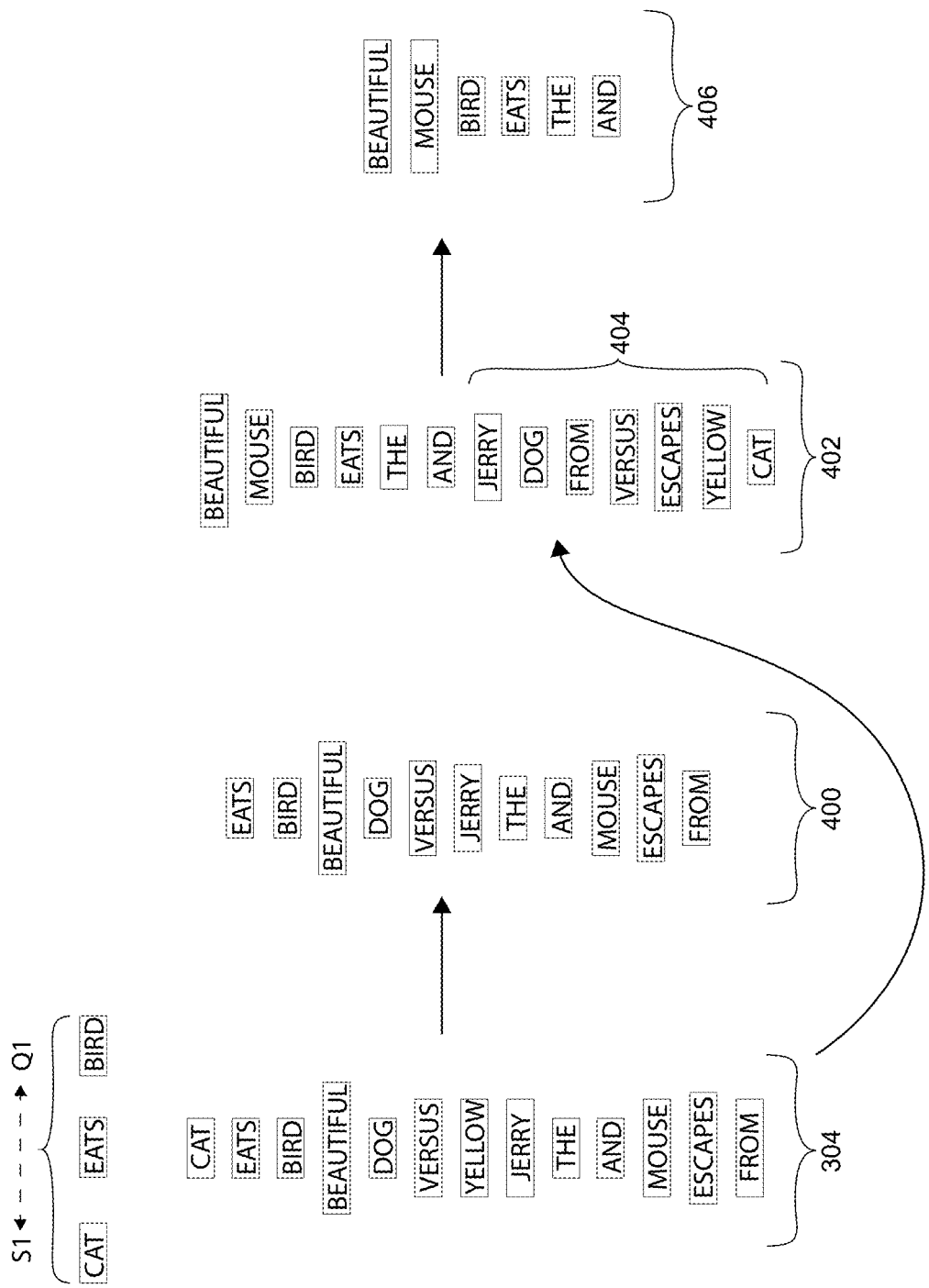
FIG. 4 depicts pluralities of candidate n-grams selected from the plurality of n-grams of FIG. 3 according to some embodiments of the present technology.

The generation of the first training set 601 for the n-gram "cat" of the past user query Q1 will now be described with references to FIGS. 4 and 5. In FIG. 4, there is depicted the parsed past user query Q1 (the sequence of n-grams S1). In order to generate the first training set 601 for the n-gram "cat" of the past user query Q1, the server 112 may be configured to select at least one candidate n-gram from the plurality of n-grams 304 based on the pair-based co-occurrence of the n-gram "cat" with each respective one of the plurality of n-grams 304.

In some embodiments, the server 112 may be configured to select n-grams from the plurality of n-grams 304 as candidate n-grams only if their pair-based co-occurrence with the n-gram "cat" in the plurality of past user queries 300 is other than null. In other words, the server 112 may be configured to select n-grams from the plurality of n-grams 304 as candidate n-grams only if they co-occurred at least once with the n-gram "cat" in the plurality of past user queries 300.

Assuming that a given n-gram co-occurs with another given n-gram when the given n-gram is either one of (i) a preceding n-gram to the another given n-gram in a same past user query and (ii) a following n-gram to the another given n-gram in the same past user query, in this case, all of the n-grams in the plurality of n-grams 304 co-occurred with the n-gram "cat" in the plurality of past user queries 300, except for the n-grams "cat" and "yellow" of the plurality of n-grams 304. As such, the server 112 may be configured to select a first plurality of candidate n-grams 400 for the n-gram "cat" where each one of the first plurality of candidate n-grams 400 co-occurred at least once with the n-gram "cat" in the plurality of past user queries 300.

In other embodiments of the present technology, the server 112 may be configured to rank the plurality of n-grams 304 based on their respective pair-based co-occurrence with the n-gram "cat" in the plurality of past user queries 300. For example, the server 112 may be configured to determine a ranked plurality of n-grams 402 which comprises all of the n-grams of the plurality of n-grams 304 but in a ranked order according to their respective pair-based co-occurrence with the n-gram "cat" in the plurality of past user queries 300. Let it be assumed that the n-gram "beautiful" has co-occurred more often with the n-gram "cat" in the plurality of past user queries 300 than any other n-gram in the plurality of n-grams 304. Therefore, the n-gram "beautiful" is ranked first in the ranked plurality of n-grams 402.

It is contemplated that the server 112 may determine a second plurality of candidate n-grams 406 by selecting top ranked n-grams in the ranked plurality of n-grams 402. As seen in FIG. 4, the server 112 selects the top six ranked n-grams, for example, in the ranked plurality of n-grams 402 as the second plurality of candidate n-grams 406.

In some embodiments, the server 112 may select only a top one of the ranked plurality of n-grams 402 as a given candidate n-gram. In other embodiments, the server 112 may be configured to select a pre-determined number of top ranked n-grams in the ranked plurality of n-grams 402 as the second plurality of candidate n-grams 406. In yet further embodiments, the server 112 may be configured to select n-grams in the ranked plurality of n-grams 402 as the second plurality of candidate n-grams 406 only if their respective pair-based co-occurrence with the n-gram "cat" in the plurality of past user queries 300 is above a pre-determined threshold. It is contemplated that the pre-determined number of top ranked n-grams and/or the pre-determined threshold may have been determined by the operator of the server 112 and will depend on inter alia various implementations of the present technology.

It should be understood that the second plurality of candidate n-grams 406 comprises all the n-grams of the ranked plurality of n-grams 402 except for low-ranked n-grams that are included in a sub-set of n-grams 404 of the ranked plurality of n-grams 402. The sub-set of n-grams 404 comprises infrequently co-occurring n-grams of the plurality of n-grams 304 with the n-gram "cat" in the plurality of past user queries 300.

It is contemplated that the server 112 may be configured to use either one of the first plurality of candidate n-grams 400 and the second plurality of candidate n-grams 406 for generating the first training set 601 (see FIG. 6) for the n-gram "cat" of the past user query Q1. As such, although it will now be described how the second plurality of candidate n-grams 406 is used by the server 112 for generating the first training set 601, it should be understood that the server 112 may use the first plurality of candidate n-grams 400 for generating the first training set 601 similarly to how the server 112 may use the second plurality of candidate n-grams 406 for generating the first training set 601 without departing from the scope of the present technology.

The server 112 is configured to generate a respective feature vector for (i) each candidate n-gram in the second plurality of candidate n-grams 406 and (ii) the n-gram "cat". In other words and with reference to FIG. 5, the server 112 is configured to generate a plurality of feature vectors 500 comprising feature vectors 502, 504, 506, 508, 510, 512 and 514 which are respectively associated with the n-gram "cat", and the candidate n-grams "beautiful", "mouse", "bird", "eats", "the" and "and" from the second plurality of candidate n-grams 406. The server 112 is configured to generate a respective feature vector for a given n-gram based on its respective n-gram features. As previously mentioned, the n-gram features of a given n-gram comprise indications of the pair-based co-occurrence of the given n-gram with each one of the plurality of n-grams 304.

For example, the feature vector 502 associated with the n-gram "cat" is based on the indications of the pair-based co-occurrence of the n-gram "cat" with each one of the n-grams in the plurality of n-grams 304. In another example, a feature vector 504 associated with the candidate n-gram "beautiful" from the plurality of candidate n-grams 406 is based on the indications of the pair-based co-occurrence of the n-gram "beautiful" with each one of the n-grams in the plurality of n-grams 304.

The server 112 is also configured to generate a plurality of labels 560 comprising labels 524, 526, 528, 530, 532 and 534 which are respectively associated with each one of the second plurality of candidate n-grams 406. The server 112 is configured to generate a given label in the plurality of labels 560 by verifying whether the respectively associated candidate n-gram from the second plurality of candidate n-grams 406 co-occurs with the n-gram "cat" in the past user query Q1.

In this case, assuming that a given n-gram co-occurs with another given n-gram when the given n-gram is either one of (i) a preceding n-gram to the another given n-gram in a same past user query and (ii) a following n-gram to the another given n-gram in the same past user query, by executing the verification, the server 112 may determine that the candidate n-grams "beautiful", "mouse", "the" and "and" do not co-occur with the n-gram "cat" in the past user query Q1, while the candidate n-grams "bird" and "eats" do co-occur with the n-gram "cat" in the past user query Q1. As such, the labels 524, 526 532 and 534 respectively associated with the candidate n-grams "beautiful", "mouse", "the" and "and" are assigned with a value of "0", while the labels 528 and 530 respectively associated with the candidate n-grams "bird" and "eats" are assigned with a value of "1".

It can be said that the values assigned to the plurality of labels 560 are probabilities of the respective candidate n-grams in the second plurality of n-grams 406 of co-occurring with the n-gram "cat" in the past user query Q1. However, since the past user query Q1 is known, the probabilities associated with the candidate n-grams in the second plurality of candidate n-grams 406 may be either "1" (100%) or "0" (0%).

It should be understood that the plurality of labels 560 is indicative of a group-based co-occurrence of a given group of n-grams in the past user query Q1 where the given group of n-grams comprises the n-gram "cat" and the candidate n-grams "bird" and "eats" of the second plurality of candidate n-grams 406, since the candidate n-grams "bird" and "eats" co-occurred together with the n-gram "cat" as the given group in the past user query Q1.

Generally speaking, unlike a given pair-based co-occurrence which is indicative of a number of times that a given pair of n-grams in the plurality of n-grams 304 have co-occurred in the plurality of past user queries 300, a given group-based co-occurrence is indicative of whether a given group of n-grams co-occurs together in a given past user query.

Therefore, it can be said that a given pair-based co-occurrence is determined for two (a pair of) n-grams at a time based on all past user queries in the plurality of past user queries 300, while a given group-based co-occurrence is determined for a group of n-grams comprising (i) a given n-gram (for which a respective training set is generated) and (ii) at least one candidate n-gram. Also, it can be said that a given pair-based co-occurrence is determined based on all past user queries of the plurality of past user queries 300, while a given group-based co-occurrence is determined for a given past user query of the plurality of past user queries 300 for which a given training set is generated and, therefore, is specific to the given past user query for which the training set is generated and to the given group of n-grams.

It should also be understood that the group-based co-occurrence, not only is indicative of a co-occurrence of the n-gram "cat" and the candidate n-grams "bird" and "eats" as the given group of n-grams in the past user query Q1, but is also indicative of the candidate n-grams "beautiful", "mouse", "the" and "and" of the second plurality of candidate n-grams 406 not being in the given group of n-grams that co-occurs in the past user query Q1.

Figure 6:
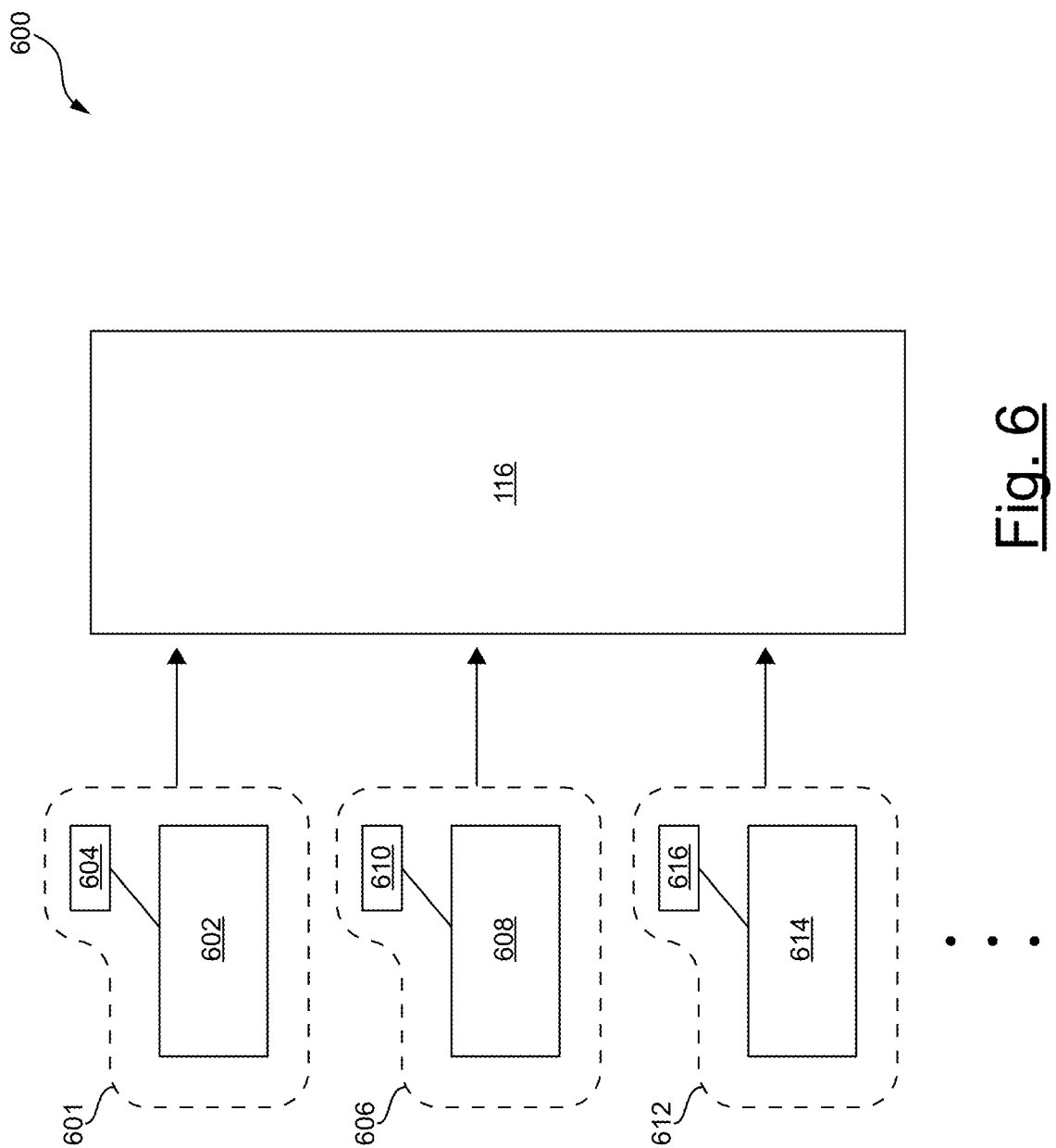
FIG. 6 depicts a training procedure of the MLA of FIG. 1 according to some embodiments of the present technology.

With reference to FIG. 6, as previously mentioned, there is depicted the first training set 601 for the n-gram "cat" of the past user query Q1. The training set 601 comprises a first input portion 602 and a first label portion 604.

The first input portion 602 comprises information indicative of (i) the n-gram "cat" of the past user query Q1, (ii) the second plurality of candidate n-grams 406 and (iii) the plurality of feature vectors 500. It is contemplated that the first input portion 602 also comprises information indicative of associations between the n-gram "cat" of the past user query Q1 and the feature vector 502 as well as of associations between each one of the second plurality of candidate n-grams 406 and the respectively associated feature vectors of the plurality of feature vectors 500.

The first label portion 604 comprises information indicative of the plurality of labels 560. It is also contemplated that the first label portion 604 also comprises information indicative of associations between each one of the second plurality of candidate n-grams 406 and a respective one of the plurality of labels 560. As previously mentioned, the plurality of labels 560 is indicative of the group-based co-occurrence of the given group of n-grams in the past user query Q1 where the given group of n-grams comprises the n-gram "cat" and the candidate n-grams "bird" and "eats". Therefore, it can be said that the first label portion 604 is also indicative of the group-based co-occurrence of the given group of n-grams in the past user query Q1 where the given group of n-grams comprises the n-gram "cat" and the candidate n-grams "bird" and "eats".

It is also contemplated that the first label portion 604 is also indicative of the candidate n-grams "beautiful", "mouse", "the" and "and" of the second plurality of candidate n-grams 406 not being in the group of n-grams that co-occurs in the past user query Q1.

As previously mentioned, although in FIG. 6 there is depicted only three (3) training sets where the training set 601, the second training set 606 and the third training set 612 are associated with a respective n-gram from the past user query Q1, it should further be understood that the server 112 may be configured to generate other training sets for each n-gram of each one of the plurality of past user queries 300 similarly to how the server 112 may generate the first, second and third training sets 601, 606 and 612 for the past user query Q1.

The server 112 is thus configured to execute a training procedure 600 of the MLA 116. The training of the MLA 116 is based on the first training set 601, the second training set 606 and the third training set 612 (and the other training sets for each n-gram of each one of the plurality of past user queries 300). Via the execution of the training procedure 600, the MLA 116 is trained to, in a sense, "learn" relationships and/or data patterns between the candidate n-grams for a given n-gram, their respective pair-based co-occurrence with each one of the plurality of n-grams 304 and the group-based co-occurrence with the given n-gram in the respective past user query. It can be said that, not only does the MLA 116 "learn" which pairs of n-grams frequently co-occur in the plurality of past user queries 300, the MLA 116 also "learns" which groups of n-grams co-occur in the plurality of past user queries 300.

For example, the MLA 116 may "learn" that the n-gram "light" frequently co-occurs with the n-gram "green" (based on pair-based co-occurrence) and the n-gram "red" (based on pair-based co-occurrence). In this example, the MLA 116 may also "learn" that the n-gram "light" co-occurs more frequently with the n-gram "green" (based on pair-based co-occurrence) than with the n-gram "red" (based on pair-based co-occurrence). However, the MLA 116 may also "learn" than if the n-gram "light" co-occurs with the n-gram "stop" in a given past user query, the given past user query is more likely to comprise the group of n-grams "red", "light" and "stop" (based on group-based co-occurrence) than the group of n-grams "green", "light" and "stop" (based on group-based co-occurrence).

Once the MLA 116 has been trained, the MLA 116 may be used by the server 112 in order to determine, during its in-use phase, a predicted group-based co-occurrence of a given in-use group of n-grams comprising (i) at least one given in-use n-gram and (ii) at least one given in-use candidate n-gram. This predicted group-based co-occurrence of the given in-use group of n-grams may be used by the server 112 for determining which of the at least one given in-use candidate n-grams is to be used as at least one query-completion suggestion for a given partial user-entered query that comprises the at least one given in-user n-gram.

How the MLA 116 may be used during its in-use phase for determining the predicted group-based co-occurrence of the given in-use group of n-grams comprising (i) the at least one given in-use n-gram and (ii) the at least one given in-use candidate n-gram and how this predicted group-based co-occurrence may be used for determining which of the at least one given in-use candidate n-grams is to be used as the at least one query-completion suggestion will now be described in more details.

The in-use Phase of the MLA 116

Figure 8:
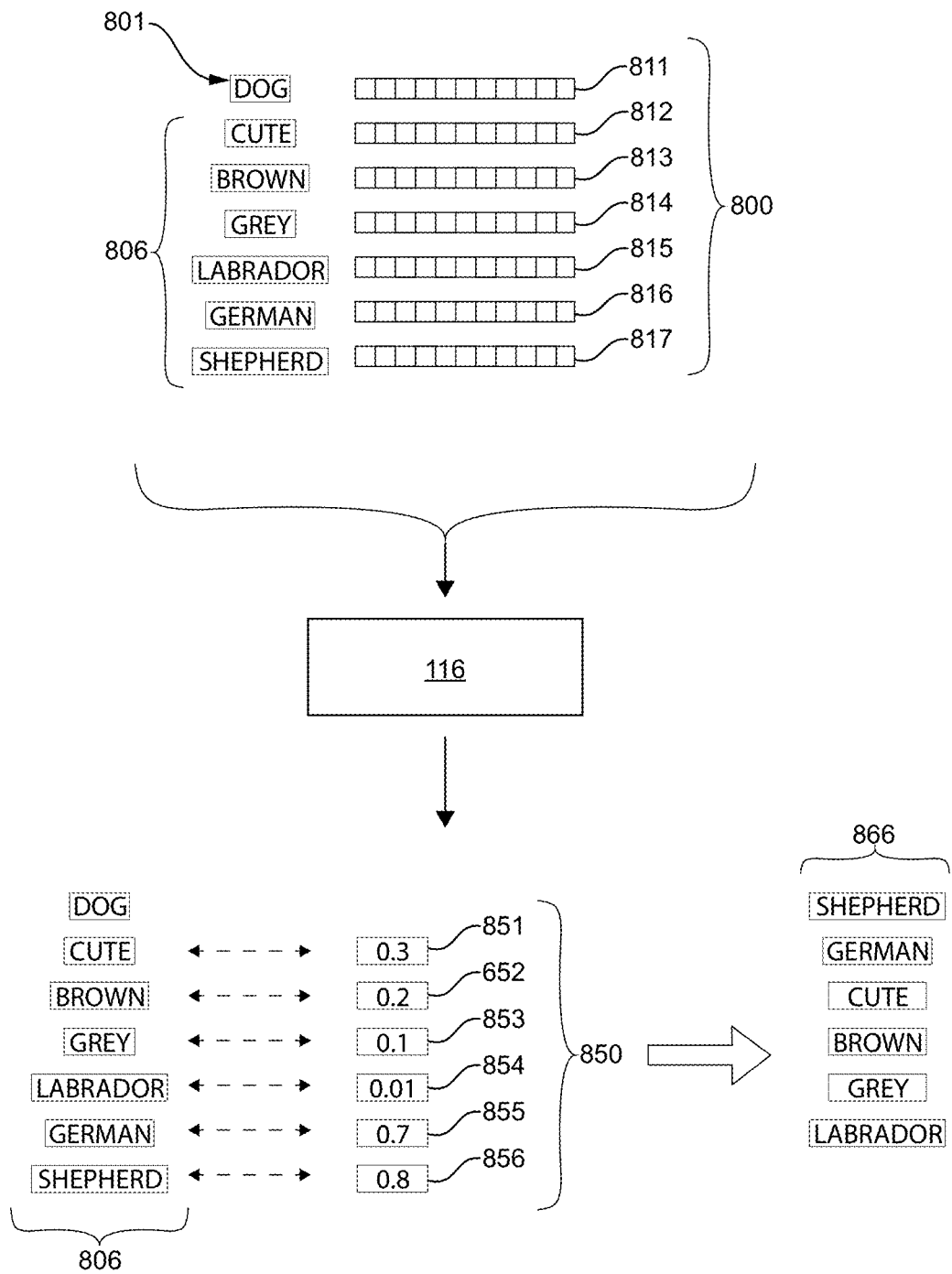
FIG. 8 depicts an in-use phase of the MLA of FIG. 1 according to some embodiments of the present technology.

As previously mentioned, the server 112 is configured to receive the data packet 150 depicted in FIG. 1 where the data packet 150 comprises the information indicative of the partial user-entered query 701 "dog" (see FIG. 7). The server 112 is also configured to parse the partial user-entered query 701 into at least one in-user n-gram similarly to how the server 112 has been configured to parse the plurality of past user queries 300 into the plurality of sequences of n-grams 302. For example and with reference to FIG. 8, the server 112 may be configured to parse the partial user-entered query 701 into the in-use n-gram 801 being "dog".

The server 112 is configured to select, for the in-use n-gram 801, at least one in-use candidate n-gram from the plurality of n-grams 304 based on the pair-based co-occurrence of each one of the plurality of n-grams 304 with the in-use n-gram 801, similarly to how the server 112 selected either one of the first plurality of candidate n-grams 400 and the second plurality of candidate n-grams 406. As such, let it be assumed that the server 112 selects an in-use plurality of candidate n-grams 806 that comprises the in-use candidate n-grams "cute", "brown", "grey", "labrador", "german" and "schepherd".

The server 112 is configured to generate a respective feature vector for each in-use candidate n-gram in the in-use plurality of candidate n-grams 806 and for the in-use n-gram 801 "dog" similarly to how the server 112 has been configured to generate a respective feature vector for each candidate n-gram in the second plurality of candidate n-grams 406 and for the n-gram "cat" during the training phase of the MLA 116. As such, the server 112 may be configured to generate an in-use plurality of feature vectors 800 that comprises a feature vector 811 for the in-use n-gram 801 "dog" and feature vectors 812, 813, 814, 815, 816 and 817 for a respective one of the in-use plurality of candidate n-grams 806.

The server 112 is configured to input the in-use n-gram 801, the in-use plurality of candidate n-grams 806 and the in-use plurality of feature vectors 800 into the trained MLA 116, which generates a plurality of predicted labels 850. Each one of the plurality of predicted labels 850 is associated with a respective one of the in-use plurality of candidate n-grams 806. As such, a predicted label 851 is associated with the in-use candidate n-gram "cute", a predicted label 852 is associated with the in-use candidate n-gram "brown", a predicted label 853 is associated with the in-use candidate n-gram "grey", a predicted label 854 is associated with the in-use candidate n-gram "labrador", a predicted label 855 is associated with the in-use candidate n-gram "german", a predicted label 856 is associated with the in-use candidate n-gram "shepherd".

It should be understood that the plurality of predicted labels 850 is indicative of a predicted group-based co-occurrence of a given potential group of n-grams that should co-occur in a given potential user query, where the given potential group of n-grams comprises the in-use n-gram 801 and at least one of the in-use plurality of candidate n-grams 806.

In this case, the MLA 116 generates the plurality of predicted labels 850 where a given one of the plurality of predicted labels 850 is a probability of a respective one of the in-use plurality of candidate n-grams 806 to be included in the given potential group of n-grams (e.g., the given potential user query), if (i) the in-use n-gram 801 "dog" is included in the given potential group of n-grams and (ii) the given potential group of n-grams comprises at least one other n-gram that is/are amongst the in-use plurality of candidate n-grams 806.

The server 112 is configured to determine which of the in-use plurality of candidate n-grams 806 is to be used as at least one query-completion suggestion for the partial user-entered query 701 based on the plurality of predicted labels 850. To that end, the server 112 may be configured to rank the in-use candidate n-grams in the in-use plurality of candidate n-grams 806 based on values of the respectively associated predicted labels in the plurality of predicted labels 850 and select top ranked in-use candidates for use as query-completion suggestions for the partial user-entered query 701.

For example, the server 112 may be configured to generate a ranked in-use list of candidate n-grams 866 which comprises the in-use candidates of the in-use plurality of candidate n-grams 806 that are ranked based on the values of the respectively associated predicted labels in the plurality of predicted labels 850. As such, the in-use candidate n-gram "shepherd" may be ranked first in the ranked in-use list of candidate n-grams 866 since the respectively associated predicted label 856 is indicative of a probability of "0.8" (80%) which is the highest probability amongst the plurality of predicted labels 850. Similarly, the in-use candidate n-gram "labrador" may be ranked last in the ranked in-use list of candidate n-grams 866 since the respectively associated predicted label 854 is indicative of a probability of "0.01" (1%) which is the lowest probability amongst the plurality of predicted labels 850.

In this example, the server 112 may select top two ranked in-use candidate n-grams of the tanked in-use list of candidate n-grams 866 as the query-completion suggestions 901 and 902 depicted in FIG. 9.

As previously mentioned, the server 112 may generate the data packet 160 depicted in FIG. 1 which comprises information indicative of the query-completion suggestion 901 being "shepherd" and the query-completion suggestion 902 being "german". The data packet 160 is then transmitted via the communication network 110 and received by the device 104 for display of the query-completion suggestions 901 and 902 to the user 102 via the browser application 106 such as depicted in FIG. 9 at the third moment in time.

The user 102 may desire to select at least one of the query-completion suggestions 901 and 902 for supplementing the partial-user query 701. Once at least one of the query-completion suggestions 901 and 902 is selected by the user 102, the user 102 may submit the desired user query for receiving search results associated with the desired user query.

Figure 10:
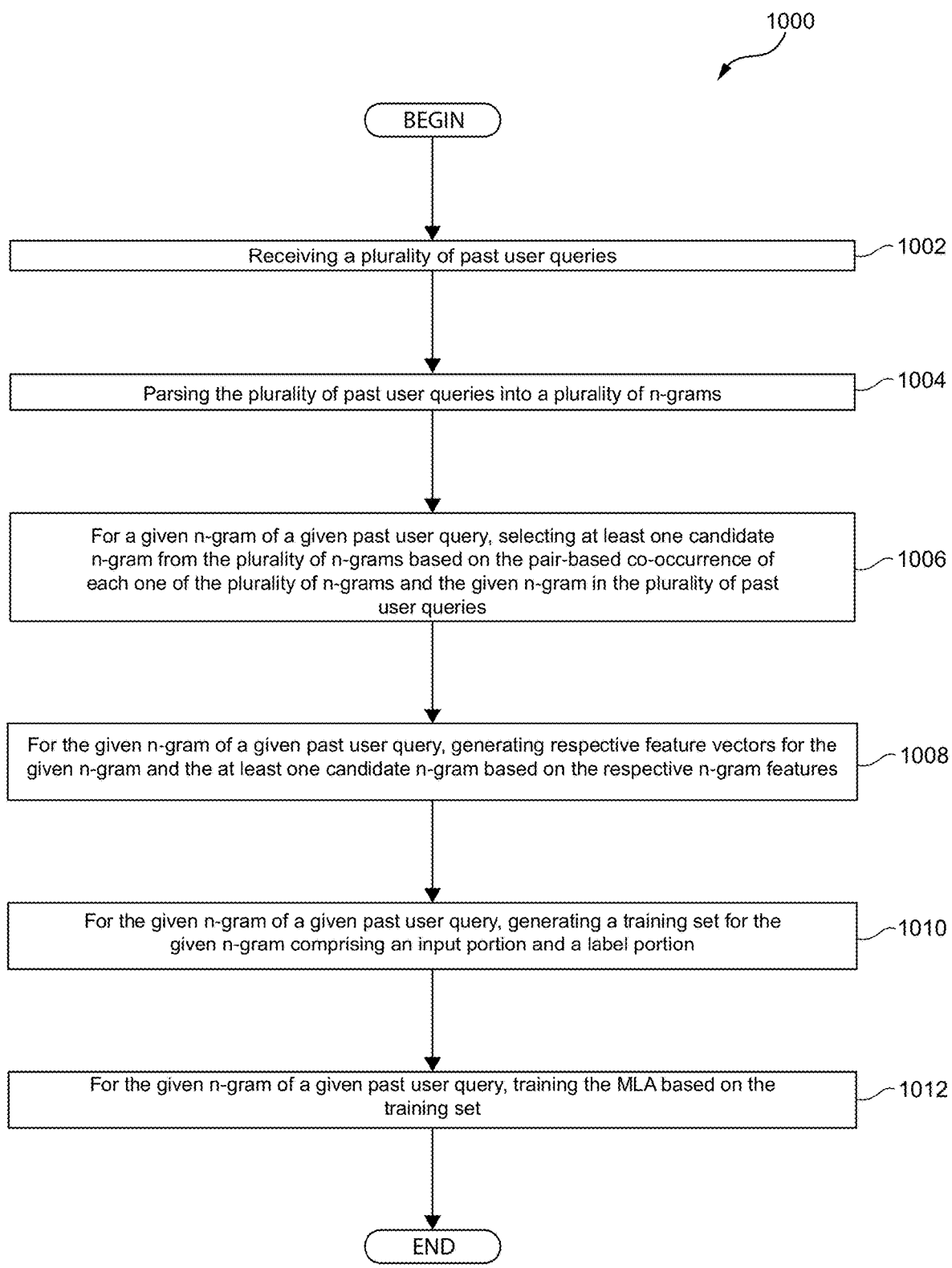
FIG. 10 is a scheme-block illustration of a method of training the MLA of FIG. 1 according to some embodiments of the present technology.

In some embodiments of the present technology, the server 112 may be configured to execute a method 1000 depicted in FIG. 10 of training the MLA 116 for determining at least one query-completion suggestion for a given partial user-entered query. Various steps of the method 1000 will now be described in more details.

Step 1002: Receiving a Plurality of Past User Queries

The method 1000 begins at step 1002 with the server 112 being configured to receive the plurality of past user queries 300 (see FIG. 3). As previously mentioned, the server 112 may make use of historical information collected from a large quantity of past user queries. As such, the query database 122 that is communicatively coupled to the server 112 is configured to store information associated with past user queries submitted to the server 112.

Therefore, the server 112 may receive the plurality of past user queries 300 from the query database 122. Which of the large quantity of past user queries are received by the server 112 as the plurality of past user queries 300 is not particularly limiting but, suffice it to state that the plurality of past user queries 300 may comprise a large number of past user queries such as 1000, 10000, 100000 past user queries and the like without departing from the scope of the present technology.

In some embodiments of the present technology, the plurality of past user queries 300 may comprise various text excerpts which may or may not be past user queries that have been previously submitted to the search engine host be the server 112. In some case, the plurality of past user queries 300 may comprise past user queries that have been previously submitted to other search engines than the one hosted by the server 112. In other cases, the plurality of past user queries 300 may comprise text excerpts retrieved from other web resources hosted on other servers than the server 112.

Step 1004: Parsing the Plurality of Past User Queries into a Plurality of N-Grams The method 1000 continues to step 1004 with the server 112 configured to parse the plurality of past user queries 300 into the plurality of n-grams 304 (see FIG. 3).

As previously mentioned, a given past user query may be composed of at least one n-gram. Generally speaking, a given n-gram is a sequence of one or more characters from a given text. It is contemplated that n-grams may be phonemes, syllables, letters, words or other text portions of the given text and will depend on inter alia various implementations of the present technology.

Each one of the plurality of n-grams 304 is associated with at least one respective past user query from the plurality of past user queries 300. For example, the n-gram "cat" in the plurality of n-grams 304 is associated with the past user queries Q1, Q2, Q3, Q5, Q6 and Q7 since the n-gram "cat" is part of each one of the past user queries Q1, Q2, Q3, Q5, Q6 and Q7. In another example, the n-gram "escapes" in the plurality of n-grams 304 is associated with the past user query Q7 since the n-gram "escapes" is part of the past user query Q7.

It is contemplated that the server 112 may be configured to store the plurality of n-grams 304 with the respectively associated past user queries in the main database 120.

The server 112 may be configured to associate each one of the plurality of n-grams 304 with respective n-gram features. Generally speaking, n-gram features of a respective n-gram comprise indications of the pair-based co-occurrence of the respective n-gram with each one of the plurality of n-grams 304. For example, the n-gram features of the n-gram "cat" comprise indications of the pair-based co-occurrence of the n-gram "cat" with each one of the n-grams "cat", "eats", "bird", "beautiful", "dog", "versus", "yellow", "jerry", "the", "and", "mouse", "escapes" and "from" in the plurality of n-grams 304. It is contemplated that the server 112 may be configured to determine the n-gram features to be associated with each one of the plurality of n-grams 304 based on the plurality of n-grams 304 and the plurality of past user queries 300.

In order to determine the pair-based co-occurrence of a given pair of n-grams, the server 112 may be configured to determine the number of times that the given pair of n-grams co-occurred in the plurality of past user queries 300. It is contemplated that the pair-based co-occurrence of a given pair of n-grams may also be a ratio of (i) the number of times that the given pair of n-grams in the plurality of n-grams 304 have co-occurred in the plurality of past user queries 300 over (ii) a number of past user queries in the plurality of past user queries 300.

In some embodiments of the present technology, a given n-gram may be determined by the server 112 as co-occurring with another given n-gram when the given n-gram is either one of (i) a preceding n-gram to the another given n-gram in a same past user query and (ii) a following n-gram to the another given n-gram in the same past user query.

In other embodiments of the present technology, the given n-gram may be determined by the server 112 as co-occurring with the another given n-gram when the given n-gram is either one of (i) an immediately preceding n-gram to the another given n-gram in a same past user query and (ii) an immediately following n-gram to the another given n-gram in the same past user query.

It is also contemplated that the server 112 may store indications of respective n-gram features of each one of the plurality of n-grams 304 in the main database 120 in association with respective n-grams of the plurality of n-grams 304.

Step 1006: For a Given N-Gram of a Given Past User Query, Selecting at Least One Candidate N-Gram from the Plurality of N-Grams Based on the Pair-Based Co-Occurrence of Each One of the Plurality of N-Grams and the Given N-Gram in the Plurality of Past User Queries The method 1000 continues to step 1006 with the server 112 configured, for a given n-gram of a given past user query of the plurality of past user queries 300, to select at least one candidate n-gram from the plurality of n-grams 304 based on the pair-based co-occurrence of each one of the plurality of n-grams 304 and the given n-gram in the plurality of past user queries 300.

For example, with reference to FIG. 4, the server 112, for the n-gram "cat" of the past user query Q1, the server 112 may select at least one candidate n-gram from the plurality of n-grams 304 based on the pair-based co-occurrence of each one of the plurality of n-grams 304 and the n-gram "cat" in the plurality of past user queries 300.

In some embodiments of the present technology, the server 112 may determine the first plurality of candidate n-grams 400 for the n-gram "cat". Each one of the first plurality of candidate n-grams 400 co-occurred at least once with the n-gram "cat" in the plurality of past user queries 300. Therefore, it can be said that the server 112 may be configured to select n-grams from the plurality of n-grams 304 as candidate n-grams only if they co-occurred at least once with the n-gram "cat" in the plurality of past user queries 300.

In other embodiments of the present technology, the server 112 may determine the second plurality of candidate n-grams 406. To that end, the server 112 may (i) rank the plurality of n-grams 304 based on their respective pair-based co-occurrence with the n-gram "cat" in the plurality of past user queries 300, thereby determining the ranked plurality of n-grams 402, and (ii) select top ranked n-grams in the ranked plurality of n-grams 402 to be included in the second plurality of candidate n-grams 406.

It should be understood that the second plurality of candidate n-grams 406 comprises all the n-grams of the ranked plurality of n-grams 402 except for low-ranked n-grams that are included in the sub-set of n-grams 404 of the ranked plurality of n-grams 402. It is assumed that the sub-set of n-grams 404 comprises rarely co-occurring n-grams of the plurality of n-grams 304 with the n-gram "cat" in the plurality of past user queries 300.

It is contemplated that the server 112 may be configured to select the pre-determined number of top ranked n-grams in the ranked plurality of n-grams 402 to be included in the second plurality of candidate n-grams 406. In yet further embodiments, the server 112 may be configured to select n-grams in the ranked plurality of n-grams 402 to be included the second plurality of candidate n-grams 406 only if their respective pair-based co-occurrence with the n-gram "cat" in the plurality of past user queries 300 is above the pre-determined threshold. It is contemplated that the pre-determined number of top ranked n-grams and/or the pre-determined threshold may have been determined by the operator of the server 112 and will depend on inter alia various implementations of the present technology.

It is also contemplated that the server 112 may be configured to store at least one of (i) the first plurality of candidate n-grams 400 and (ii) the second plurality of candidate n-grams 406 in the main database 120 in association with the n-gram "cat".

Step 1008: For the Given N-Gram of a Given Past User Query, Generating Respective Feature Vectors for the Given N-Gram and the at Least One Candidate N-Gram Based on the Respective N-Gram Features The method 1000 continues to step 1008 with the server 112 configured, for the given n-gram of the given past user query (e.g., the n-gram "cat" of the past user query Q1), to generate a respective feature vector for the given n-gram (e.g., the n-gram "cat" of the past user query Q1) and the at least one candidate n-gram for the given n-gram based on the respective n-gram features.

Figure 5:
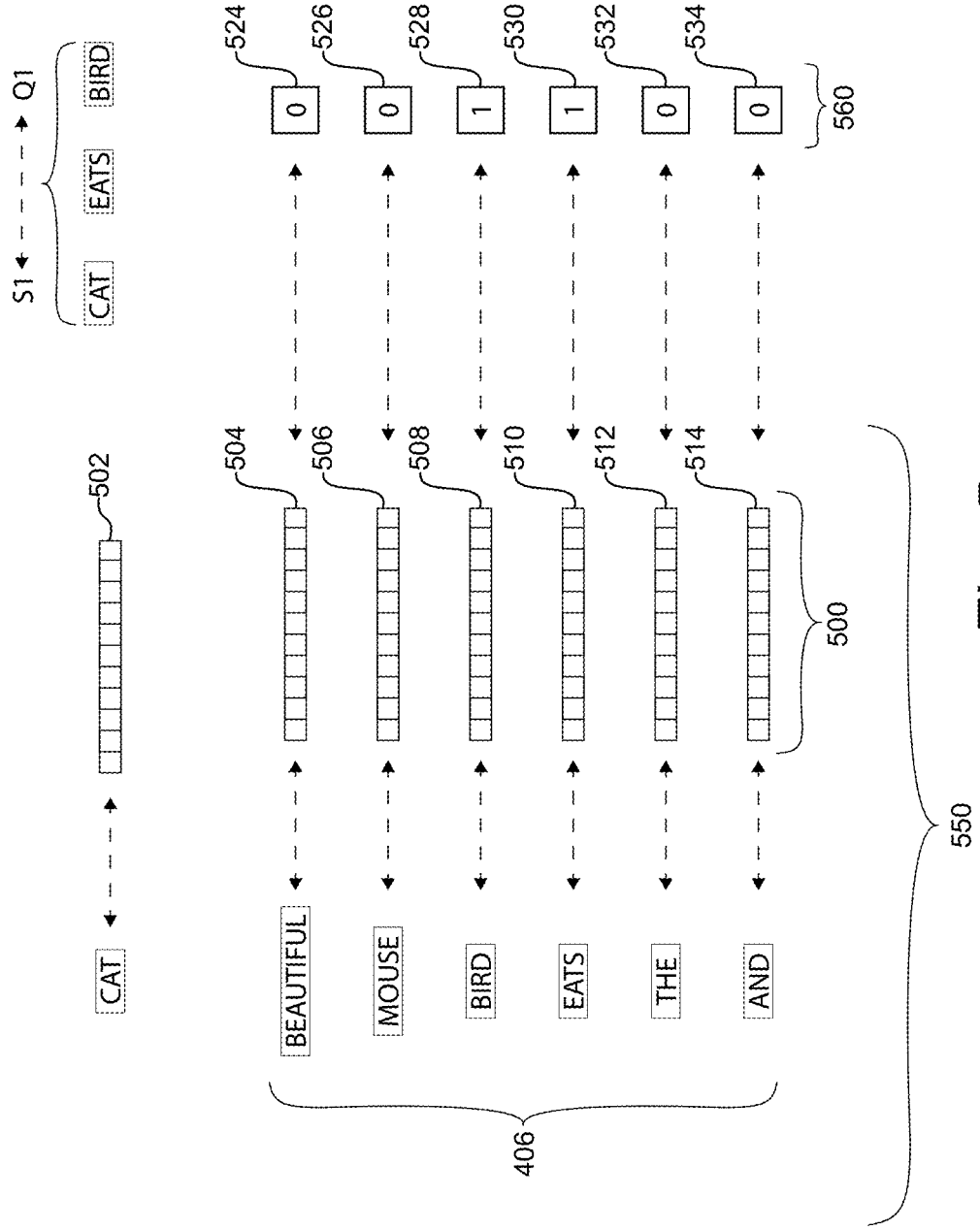
FIG. 5 depicts feature vectors and labels generated for a training set for training a Machine Learned Algorithm (MLA) of FIG. 1 according to some embodiments of the present technology.

With reference to FIG. 5, there is depicted the plurality of feature vectors 500 comprising feature vectors 502, 504, 506, 508, 510, 512 and 514 which are respectively associated with the n-gram "cat", and the candidate n-grams "beautiful", "mouse", "bird", "eats", "the" and "and" from the second plurality of candidate n-grams 406. For example, the feature vector 502 associated with the n-gram "cat" is based on the n-gram features of the n-gram "cat" and, therefore, the feature vector 502 is based on the indications of the pair-based co-occurrence of the n-gram "cat" with each one of the n-grams in the plurality of n-grams 304.

It is contemplated that the server 112 may generate feature vectors for each one of the first plurality of candidate n-grams 402 similarly to how the server 112 is configured to generate the feature vectors 504, 506, 508, 510, 512 and 514 for respective ones of the second plurality of candidate n-grams 406.

It is also contemplated that the server 112 may be configured to store each one of the plurality of feature vectors 500 in association with a respective n-gram in the main database 120.

Step 1010: For the Given N-Gram of a Given Past User Query, Generating a Training Set for the Given N-Gram Comprising an Input Portion and a Label Portion The method continues to step 1010 with the server 112 configured, for the given n-gram of the given past user query (e.g., the n-gram "cat" of the past user query Q1), to generate a respective training set. With reference to FIG. 6, the server 112 may generate the first training set 601 for the n-gram "cat" of the past user query Q1.

The first training set 601 comprises the first input portion 602 that is based on the n-gram "cat" of the past user query Q1, the second plurality of candidate n-grams 406 and the plurality of feature vectors 500. It is contemplated that the first input portion 602 comprises information indicative of associations between the n-gram "cat" of the past user query Q1 and the feature vector 502 as well as of associations between each one of the second plurality of candidate n-grams 406 and the respectively associated feature vectors of the plurality of feature vectors 500.

The first training set 601 also comprises the first label portion 604. The first label portion 604 is based on the plurality of label 560 (see FIG. 5) that may be generated by the server 112. The plurality of labels 560 comprises the labels 524, 526, 528, 530, 532 and 534 which are respectively associated with each one of the second plurality of candidate n-grams 406. The server 112 is configured to generate a given label in the plurality of labels 560 by verifying whether the respectively associated candidate n-gram from the second plurality of candidate n-grams 406 co-occurs with the n-gram "cat" in the past user query Q1.

In this case, the labels 524, 526 532 and 534 respectively associated with the candidate n-grams "beautiful", "mouse", "the" and "and" are assigned with a value of "0", while the labels 528 and 530 respectively associated with the candidate n-grams "bird" and "eats" are assigned with a value of "1".

It can be said that the values assigned to the plurality of labels 560 are probabilities of the respective candidate n-grams in the second plurality of n-grams 406 of co-occurring with the n-gram "cat" in the past user query Q1. However, since the past user query Q1 is known, the probabilities associated with the candidate n-grams in the second plurality of candidate n-grams 406 may be either "1" (100%) or "0" (0%).

It should be understood that the plurality of labels 560 (and the first label portion 604 which is based on the plurality of labels 560) is indicative of a group-based co-occurrence of a given group of n-grams in the past user query Q1 where the given group of n-grams comprises the n-gram "cat" and the candidate n-grams "bird" and "eats" of the second plurality of candidate n-grams 406, since both the candidate n-grams "bird" and "eats" co-occurred together with the n-gram "cat" as the given group in the past user query Q1.

Generally speaking, unlike a given pair-based co-occurrence which is indicative of a number of times that a given pair of n-grams in the plurality of n-grams 304 have co-occurred in the plurality of past user queries 300, a given group-based co-occurrence is indicative of whether a given group of n-grams co-occurs together in a given past user query.

It should also be understood that the group-based co-occurrence, not only is indicative of a co-occurrence of the n-gram "cat" and the candidate n-grams "bird" and "eats" as the given group of n-grams in the past user query Q1, is indicative of the candidate n-grams "beautiful", "mouse", "the" and "and" of the second plurality of candidate n-grams 406 not being in the given group of n-grams that co-occurs in the past user query Q1.

It is contemplated that the server 112 may store the first training set 601 comprising the first input portion 602 and the first label portion 604 in the main database 120. It is also contemplated that the server 112 generate a respective training set for each n-gram in each one of the plurality of past user queries 300 and may save these training sets in the main database 120.

Step 1012: For the Given N-Gram of a Given Past User Query, Training the MLA Based on the Training Set The method 1000 continues to step 1012 with the server 112 configured, for the given n-gram of the given past user query (e.g., the n-gram "cat" of the past user query Q1), to train the MLA 116 based on the first training set 601.

For example, the server 112 may execute the training procedure 600 (see FIG. 6). During the training procedure 600, the MLA 116 may be trained based on inter alia the first training set 601, the second training set 606 and the third training set 612.

The MLA 116 is trained to, in a sense, "learn" relationships and/or data patterns between the candidate n-grams for a given n-gram, their respective pair-based co-occurrence with each one of the plurality of n-grams 304 and the group-based co-occurrence with the given n-gram in the respective past user query. It can be said that, not only does the MLA 116 "learn" which pairs of n-grams frequently co-occur in the plurality of past user queries 300, the MLA 116 also "learns" which groups of n-grams co-occur in the plurality of past user queries 300.

For example, the MLA 116 may "learn" that the n-gram "light" frequently co-occurs with the n-gram "green" (based on pair-based co-occurrence) and the n-gram "red" (based on pair-based co-occurrence). In this example, the MLA 116 may also "learn" that the n-gram "light" co-occurs more frequently with the n-gram "green" (based on pair-based co-occurrence) than with the n-gram "red" (based on pair-based co-occurrence). However, the MLA 116 may also "learn" than if the n-gram "light" co-occurs with the n-gram "stop" in a given past user query, the given past user query is more likely to comprise the group of n-grams "red", "light" and "stop" (based on group-based co-occurrence) than the group of n-grams "green", "light" and "stop" (based on group-based co-occurrence).

The MLA 116 is trained to determine, during its in-use phase, a predicted group-based co-occurrence of a given in-use group of n-grams comprising (i) at least one given in-use n-gram and (ii) at least one given in-use candidate n-gram. This predicted group-based co-occurrence of the given in-use group of n-grams may be used by the server 112 for determining which of the at least one given in-use candidate n-grams is to be used as at least one query-completion suggestion for a given partial user-entered query that comprises the at least one given in-user n-gram.

In some embodiments of the present technology, the method 1000 may further comprise receiving the partial user-entered query 701 (see FIG. 7). For example, the server 112 may receive the data packet 150 (see FIG. 1) which comprises the information indicative of "dog" being the partial user-entered query 701.

In some embodiments of the present technology, the method 1000 may further comprise parsing the partial user-entered query 701 into the at least one in-use n-gram. In this case, the at least one in-use n-gram is the in-use n-gram 801 (see FIG. 8) "dog". However, it is contemplated that a given partial user-entered query may be parsed into a given plurality of in-use n-grams.

In some embodiments of the present technology, the server 112 may be configured to determine the n-gram features associated with the in-use n-gram 801. The server 112 may determine the n-gram features associated with the in-use n-gram 801 similarly to how the server determines the n-gram features associated with the n-gram "cat" of the past user query Q1.

It is contemplated that the server 112 may be configured to verify whether the n-gram features associated with the n-gram "dog" have been previously determined and stored in the main database 120. If so, the server 112 may receive the n-gram features associated with the in-use n-gram 801 being "dog" from the main database 120.

In some embodiments of the present technology, the method 1000 may further comprise selecting the at least one in-use candidate n-gram from the plurality of n-grams 304 based on the pair-based co-occurrence of each one of the plurality of n-grams 304 with the in-use n-gram 801 in the plurality of past user queries 300. The server 112 may select the at least one in-use candidate n-gram from the plurality of n-grams 304 similarly to how the server 112 selects either one of (i) the first plurality of candidate n-grams 400 (see FIG. 4) and (ii) the second plurality of candidate n-grams 406. For example, the at least one in-use candidate n-gram for the in-use n-gram 801 being "dog" may be the in-use plurality of candidate n-grams 806 (see FIG. 8).

It is contemplated that the server 112 may be configured to verify whether a given plurality of candidate n-grams has been previously selected for the n-gram "dog" and previously stored in the main database 120. If so, the server 112 may receive the in-use plurality of candidate n-grams 806 for the in-use n-gram 801 being "dog" from the main database 120.

In some embodiments of the present technology, the server 112 may be configured to generate respective feature vectors for the in-use n-gram 801 and the in-use plurality of candidate n-grams 806 based on the respective n-gram features. For example, the server 112 may generate the in-use plurality of feature vectors 800 (see FIG. 8) similarly to how the server 112 generate the plurality of feature vectors 500.

It is contemplated that if the server 112 received the in-use plurality of candidate n-grams 806 from the main database 120, the server 112 may also receive the in-use plurality of feature vectors 800 from the main database 120.

In some embodiments of the present technology, the method 1000 may comprise the server 112 (by executing the MLA 116) determining the predicted group-based co-occurrence of the in-use n-gram 801 and of the plurality of in-use candidate n-grams 806. The server 112 may determine the predicted group-based co-occurrence of the in-use n-gram 801 and the plurality of in-use candidate n-grams 806 based on (i) the in-use n-gram 801, (ii) the plurality of in-use candidate n-grams 806 and (iii) the in-use plurality of feature vectors 800.

For example, the server 112 may be configured to input the in-use n-gram 801, the in-use plurality of candidate n-grams 806 and the in-use plurality of feature vectors 800 into the trained MLA 116 that generates the plurality of predicted labels 850. Each one of the plurality of predicted labels 850 is associated with a respective one of the in-use plurality of candidate n-grams 806.

It should be understood that the plurality of predicted labels 850 is indicative of the predicted group-based co-occurrence of a given potential group of n-grams that should co-occur in a given potential user query, where the given potential group of n-grams comprises the in-use n-gram 801 and at least one of the in-use plurality of candidate n-grams 806.

In this case, the MLA 116 generates the plurality of predicted labels 850 where a given one of the plurality of predicted labels 850 is a probability of a respective one of the in-use plurality of candidate n-grams 806 to be included in the given potential group of n-grams (e.g., the given potential user query), if (i) the in-use n-gram 801 "dog" is included in the given potential group of n-grams and (ii) the given potential group of n-grams comprises at least one other n-gram that is/are amongst the in-use plurality of candidate n-grams 806.

The server 112 may be configured to determine which of the in-use plurality of candidate n-grams 806 is to be used as at least one query-completion suggestion for the partial user-entered query 701 based on the plurality of predicted labels 850. To that end, the server 112 may be configured to rank the in-use candidate n-grams in the in-use plurality of candidate n-grams 806 based on values of the respectively associated predicted labels in the plurality of predicted labels 850 and select top ranked in-use candidates for use as the query-completion suggestions 901 and 902 (see FIG. 9) for the partial user-entered query 701.

It is contemplated that in some embodiments of the present technology, the server 112 executing the method 1000 may allow the user 102 to benefit from a large variety of query-completion suggestions for a given partial user-entered query that may precede and/or follow the partial user-entered query.

For example, as depicted in FIG. 9, the user 102 is provided with the query-completion suggestions 901 and 902 for the partial user entered query 701. The user 102 may select any combination of the query-completion suggestions 901 and 902 for supplementing the partial user entered query 701 with a preceding query term and/or following query term. In this illustrative example, the query-completion suggestion 901 "shepherd" may be selected by the user 102 for preceding the partial user-entered query 701 "dog" which would result in a given query "shepherd dog". However, such query-completion suggestions also allow the user 102 to select the query-completion suggestion 902 "german" to precede the partial user-entered query 701 "dog" which would result in a given query "german dog". Moreover, such query-completion suggestions also allow the user 102 to select both the query-completion suggestions 902 and 901 "german" and "shepherd" to follow the partial user-entered query 701 "dog" which would result in a given query "dog german shepherd". Therefore the user 102 may benefit from the query-completion suggestions 901 and 902 for supplementing the partial user entered query 701 with preceding and/or following query terms.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A method of training a machine learning algorithm (MLA) for determining a query-completion suggestion for a partial user-entered query, the partial user-entered query being part of a potential user query, the method executable by a server, the method comprising:
   receiving, by the server, a plurality of past user queries;
   parsing, by the server, the plurality of past user queries into a plurality of n-grams, each one of the plurality of n-grams being associated with at least one respective past user query and respective n-gram features, the n-gram features being indicative of a pair-based co-occurrence of n-grams from each possible pair of n-grams of the plurality of n-grams in the plurality of past user queries; and
   for a given n-gram of a given past user query:
      selecting, by the server, a plurality of candidate n-grams from the plurality of n-grams based on the pair-based co-occurrence of each one of the plurality of n-grams and the given n-gram in the plurality of past user queries;
      generating, by the server, respective feature vectors for the given n-gram and the plurality of candidate n-grams based on the respective n-gram features;
      generating, by the server, a training set for the given n-gram comprising an input portion and a label portion,
         the input portion being based on a group of n-grams and the respective feature vectors, the group of n-grams comprising (i) the plurality of candidate n-grams and (ii) the given n-gram,
         the label portion being based on the given past user query and the group of n-grams, the label portion being representative of a group-based co-occurrence of the group of n-grams in the given past user query, the group-based co-occurrence being indicative of a sub-group of candidate n-grams that co-occurs together with the given n-gram in the given past user query, and
      training, by the server, the MLA based on the training set to determine, during its in-use phase, a predicted group-based co-occurrence of an in-use group of n-grams including a plurality of in-use candidate n-grams and at least one in-use n-gram in the potential user query, the predicted group-based co-occurrence being dependent on the at least one in-use n-gram and each in-use candidate n-gram in the plurality of in-use candidate n-grams, the predicted group-based co-occurrence being indicative of a sub-group of in-use candidate n-grams amongst the plurality of in-use candidate n-grams that are likely to co-occur together with the at least one in-use n-gram in the potential user query, the at least one in-use n-gram being the partial user-entered query, the predicted group-based co-occurrence for determining the sub-group of in-use candidate n-grams to be used as the respective query-completion suggestion.

2. The method of claim 1, wherein the method comprises:
   determining, by the server, the n-gram features to be associated with each one of the plurality of n-grams based on the plurality of n-grams and the plurality of past user queries.

3. The method of claim 1, wherein the selecting the plurality of candidate n-grams from the plurality of n-grams comprises selecting, by the server, only n-grams from the plurality of n-grams that co-occurred with the given n-gram in the plurality of past user queries.

4. The method of claim 1, wherein the selecting the plurality of candidate n-grams from the plurality of n-grams comprises:
   ranking, by the server, at least some of the plurality of n-grams based on the pair-based co-occurrence of each one of the plurality of n-grams and the given n-gram in the plurality of past user queries; and
   selecting, by the server, top ranked n-grams from the at least some of the plurality of n-grams as the plurality of candidate n-grams.

5. The method of claim 1, wherein one of the plurality of n-grams co-occurred with the given n-gram in one of the plurality of past user queries when the one of the plurality of n-grams is either one of:
   a preceding n-gram to the given n-gram in the one of the plurality of past user queries, and
   a following n-gram to the given n-gram in the one of the plurality of past user queries.

6. The method of claim 5, wherein:
the preceding n-gram is an immediately preceding n-gram; and
the following n-gram is an immediately following n-gram.

7. The method of claim 1, wherein the n-gram features of the given n-gram are indicative of the pair-based co-occurrence of each one of the plurality of n-grams and the given n-gram in the plurality of past user queries.

8. The method of claim 1, wherein the method further comprises:
receiving, by the server, the partial user-entered query;
parsing, by the server, the partial user-entered query into the at least one in-use n-gram, the at least one in-use n-gram being associated with respective n-gram features;
selecting, by the server, the plurality of in-use candidate n-grams from the plurality of n-grams based on the pair-based co-occurrence of each one of the plurality of n-grams with the at least one in-use n-gram in the plurality of past user queries;
generating, by the server, respective feature vectors for the at least one in-use n-gram and the plurality of in-use candidate n-grams based on the respective n-gram features; and
determining, by the server executing the MLA, the predicted group-based co-occurrence of the in-use group of n-grams including the plurality of in-use candidate n-grams and the at least one in-use n-gram, the determining the predicted group-based co-occurrence being dependent on the at least one in-use n-gram and each in-use candidate n-gram in the plurality of in-use candidate n-grams.

9. The method of claim 8, wherein the method further comprises:
ranking, by the server, the plurality of in-use candidate n-grams based on the predicted group-based co-occurrence.

10. The method of claim 9, wherein the method further comprises:
determining, by the server, the sub-group of in-use candidate n-gram to be used as the respective query-completion suggestion based on the predicted group-based co-occurrence.

11. The method of claim 1, wherein the given n-gram is at least one of:
a letter-based n-gram;
a phoneme-based n-gram;
a syllable-based n-gram; and
a word-based n-gram.

12. A server comprising at least one processor, and memory storing executable instructions, which, when executed by the at least one processor, cause the server to:
receive a plurality of past user queries;
parse the plurality of past user queries into a plurality of n-grams, each one of the plurality of n-grams being associated with at least one respective past user query and respective n-gram features, the n-gram features being indicative of a pair-based co-occurrence of n-grams from each possible pair of n-grams of the plurality of n-grams in the plurality of past user queries; and
for a given n-gram of a given past user query:
select a plurality of candidate n-grams from the plurality of n-grams based on the pair-based co-occurrence of each one of the plurality of n-grams and the given n-gram in the plurality of past user queries;
generate respective feature vectors for the given n-gram and the plurality of candidate n-grams based on the respective n-gram features;
generate a training set for the given n-gram comprising an input portion and a label portion,
the input portion being based on a group of n-grams and the respective feature vectors, the group of n-grams comprising (i) the plurality of candidate n-grams and (ii) the given n-gram,
the label portion being based on the given past user query and the group of n-grams, the label portion being representative of a group-based co-occurrence of the group of n-grams in the given past user query, the group-based co-occurrence being indicative of a sub-group of candidate n-grams that co-occurs together with the given n-gram in the given past user query, and
train a machine learning algorithm (MLA) based on the training set to determine, during its in-use phase, a predicted group-based co-occurrence of an in-use group of n-grams including a plurality of in-use candidate n-grams and at least one in-use n-gram in a potential user query comprising a partial user-entered query, the predicted group-based co-occurrence being dependent on the at least one in-use n-gram and each in-use candidate n-gram in the plurality of in-use candidate n-grams, the predicted group-based co-occurrence being indicative of a sub-group of in-use candidate n-grams amongst the plurality of in-use candidate n-grams that are likely to co-occur together with the at least one in-use n-gram in the potential user query, the at least one in-use n-gram being the partial user-entered query, the predicted group-based co-occurrence for determining the sub-group of in-use candidate n-grams to be used as a respective query-completion suggestion.

13. The server of claim 12, wherein the instructions cause the server to:
determine the n-gram features to be associated with each one of the plurality of n-grams based on the plurality of n-grams and the plurality of past user queries.

14. The server of claim 12, wherein the instructions that cause the server to select the plurality of candidate n-grams from the plurality of n-grams comprise instructions that cause the server to select only n-grams from the plurality of n-grams that co-occurred with the given n-gram in the plurality of past user queries.

15. The server of claim 12, wherein the instructions that cause the server to select the plurality of candidate n-grams from the plurality of n-grams comprise instructions that cause the server to:
rank at least some of the plurality of n-grams based on the pair-based co-occurrence of each one of the plurality of n-grams and the given n-gram in the plurality of past user queries; and
select top ranked n-grams from the at least some of the plurality of n-grams as the plurality of candidate n-grams.

16. The server of claim 12, wherein one of the plurality of n-grams co-occurred with the given n-gram in one of the plurality of past user queries when the one of the plurality of n-grams is either one of:

a preceding n-gram to the given n-gram in the one of the plurality of past user queries, and a following n-gram to the given n-gram in the one of the plurality of past user queries.

17. The server of claim 16, wherein:

the preceding n-gram is an immediately preceding n-gram; and the following n-gram is an immediately following n-gram.

18. The server of claim 12, wherein the n-gram features of the given n-gram are indicative of the pair-based co-occurrence of each one of the plurality of n-grams and the given n-gram in the plurality of past user queries.

19. The server of claim 12, wherein the instructions cause the server to:

receive the partial user-entered query;

parse the partial user-entered query into the at least one in-use n-gram, the at least one in-use n-gram being associated with respective n-gram features;

select the plurality of in-use candidate n-grams from the plurality of n-grams based on the pair-based co-occurrence of each one of the plurality of n-grams with the at least one in-use n-gram in the plurality of past user queries;

generate respective feature vectors for the at least one in-use n-gram and the plurality of in-use candidate n-grams based on the respective n-gram features; and determine, by executing the MLA, the predicted group-based co-occurrence of the in-use group of n-grams including the plurality of in-use candidate n-grams and the at least one in-use n-gram, the server being configured to determine the predicted group-based co-occurrence being dependent on the at least one in-use n-gram and each in-use candidate n-gram in the plurality of in-use candidate n-grams.

20. The server of claim 19, wherein the instructions cause the server to:

rank the plurality of in-use candidate n-grams based on the predicted group-based co-occurrence.

* * * * *